United States Patent
Ari et al.

(10) Patent No.: US 10,719,260 B2
(45) Date of Patent: Jul. 21, 2020

(54) TECHNIQUES FOR STORING AND RETRIEVING DATA FROM A COMPUTING DEVICE

(71) Applicant: Apple Inc., Cupertino, CA (US)

(72) Inventors: Vinay Ari, Sunnyvale, CA (US); Guy D. Hemmo, Sunnyvale, CA (US); Nicholas K. Puz, Mountain View, CA (US); Lionel Li, Mountain View, CA (US); Bernard L. Gallet, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/136,187

(22) Filed: Sep. 19, 2018

(65) Prior Publication Data

US 2019/0102103 A1    Apr. 4, 2019

Related U.S. Application Data

(60) Provisional application No. 62/565,561, filed on Sep. 29, 2017.

(51) Int. Cl.
G06F 11/14    (2006.01)
G06F 3/06    (2006.01)
G06F 9/30    (2018.01)
G06F 16/907    (2019.01)
G06F 11/10    (2006.01)
G06F 11/20    (2006.01)

(52) U.S. Cl.
CPC .......... *G06F 3/0652* (2013.01); *G06F 3/0604* (2013.01); *G06F 3/065* (2013.01); *G06F 3/067* (2013.01); *G06F 3/0608* (2013.01); *G06F 3/0613* (2013.01); *G06F 3/0619* (2013.01); *G06F 3/0683* (2013.01); *G06F 9/30029* (2013.01); *G06F 11/1076* (2013.01); *G06F 11/14* (2013.01); *G06F 11/2094* (2013.01); *G06F 16/907* (2019.01); *G06F 11/1456* (2013.01)

(58) Field of Classification Search
None
See application file for complete search history.

(56) References Cited

U.S. PATENT DOCUMENTS 6,151,641 A    11/2000    Herbert
8,738,582 B2    5/2014    De Schrijver et al.
(Continued)

*Primary Examiner* — Brian R Peugh
(74) *Attorney, Agent, or Firm* — Dickinson Wright RLLP

(57) ABSTRACT

The embodiments set forth a technique that enables the storage of data at a first data storage device. The technique includes, at the first data storage device, dividing the data to produce a first and second portion of the data, in which the first and second portions are associated with a computed exclusive or ("XOR") value. Also, the technique includes deleting the second portion stored at the first data storage device, based at least in part on whether the computed XOR value is established. Also, the technique includes receiving a first replicated metadata, in which the first replicated metadata indicates a location of the second portion stored at the second data storage device. Furthermore, the technique includes communicating either the first portion or the second portion, to a remote computing device, based at least in part on the first replicated metadata.

20 Claims, 18 Drawing Sheets

(56) References Cited

U.S. PATENT DOCUMENTS

| | | |
|---|---|---|
| 2007/0174363 A1 | 7/2007 | Courtney |
| 2013/0111166 A1 | 5/2013 | Resch et al. |
| 2015/0149819 A1* | 5/2015 | Lee .................... G06F 11/1076 |
| | | 714/6.24 |

* cited by examiner

TECHNIQUES FOR STORING AND RETRIEVING DATA FROM A COMPUTING DEVICE

CROSS-REFERENCE TO RELATED APPLICATIONS

The present application claims the benefit of U.S. Provisional Application No. 62/565,561, entitled "TECHNIQUES FOR STORING AND RETRIEVING DATA FROM A COMPUTING DEVICE," filed Sep. 29, 2017, the content of which is incorporated herein by reference in its entirety for all purposes.

FIELD OF INVENTION

The described embodiments relate generally to data storage/retrieval techniques. More particularly, the present embodiments relate to techniques that maximize the storage capabilities of multiple data centers, networked together, to efficiently store and retrieve data on demand.

BACKGROUND

Many modern day applications include the ability to retrieve and store data that is not necessarily stored at the computing device where a particular application is being executed. For instance, e-mail applications, such as Apple Inc.'s Apple Mail®, can retrieve and store data objects related to e-mail messages at one or more remote e-mail servers. Also, cloud-based data storage applications, such as Apple Inc.'s iCloud®, can retrieve and store data objects associated with photos, videos, documents, etc., with the assistance of server farms configured to store large amounts of data. In order efficiently store such large quantities of data, a data center is used to physically house data storage computing devices, such as the aforementioned e-mail servers and server farms, that are designed to store high volumes of data. A data center generally includes multiple physical containers in which one container can include several data storage computing devices grouped together.

In order to account for scenarios in which a particular data center suddenly becomes unavailable, i.e., one or more data storage computing devices housed within the data center suddenly lose network connectivity, other data centers, implemented within the same data network as the unavailable data center, can be used to retrieve data stored at the unavailable data center. For instance, using data replication procedures, each interconnected data center, including the aforementioned unavailable data center, can synchronously/asynchronously create replicated versions of their respective data (using their respective data storage computing devices) for distribution among the different interconnected data centers. Using replicated versions of data in this manner allows an application to maintain continued access to pertinent data objects, despite the sudden unavailability of a particular data center that initially stored the pertinent data objects.

Although data replication procedures do provide the benefit of backing up valuable data, the duplication of data objects in this fashion can potentially impact the performance of an application seeking access to a particular data object, e.g., when synchronous approaches are utilized. In some instances, the duplication of data objects can actually increase the data storage costs of each data center involved in data replication procedures. For instance, during data replication procedures, a data object stored at one particular data center can be replicated and communicated to a different data center, thereby creating at least two copies of each data object that is initially stored at one data center.

Accordingly, given (1) the physical space limitations of a given data center, and (2) the limited computational resources available to data storage computing devices housed therein, the ability of a data center to efficiently store data will be compromised as the demand for more data storage increases. Also, given the limited availability of land in general, as well as the rising costs for such land and data storage computing devices, creating more data centers is clearly not a viable solution. Indeed, the need to efficiently economize existing data storage practices is paramount so that applications can store/retrieve data in a manner that does not harm a user's experience with a particular application.

SUMMARY

Accordingly, the representative embodiments set forth herein disclose techniques that enable one or more data centers to efficiently store and retrieve data stored therein. The described embodiments disclose techniques that can (1) efficiently store data at any given data center by advantageously fragmenting data and distributing the data fragments among different data centers, and (2) compute an exclusive or ("XOR") value that can be used to reconstruct data, sought by an application, during periods in which a data center is unavailable.

One embodiment sets forth a method of storing data at a first data storage device. In particular, the method includes, at the first data storage device, dividing the data to produce a first and second portion of the data, in which the first and second portions are associated with a computed exclusive or ("XOR") value. Next, the method involves deleting the second portion stored at the first data storage device, based at least in part on whether the computed XOR value has been established. Next, the method involves, receiving a first replicated metadata, in which the first replicated metadata indicates a location of the second portion stored at a second data storage device. Finally, the method includes communicating either the first portion or the second portion, to a remote computing device, based at least in part on the first replicated metadata.

One embodiment sets forth a method of providing data to a remote computing device. In particular, the method includes, at a first data storage device, computing an XOR value for the data, in which (1) the data comprises a first portion and a second portion of the data, and (2) the first portion is stored at the first data storage device and the second portion is stored at a second data storage device. Next, the method involves associating the first and second portions to the XOR value. Next, the method involves reconstructing the second portion, based at least in part on the second data storage device being unavailable, by comparing the XOR value and the first portion to produce a reconstructed second portion. Finally, the method includes communicating the reconstructed second portion to the remote computing device.

Other embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
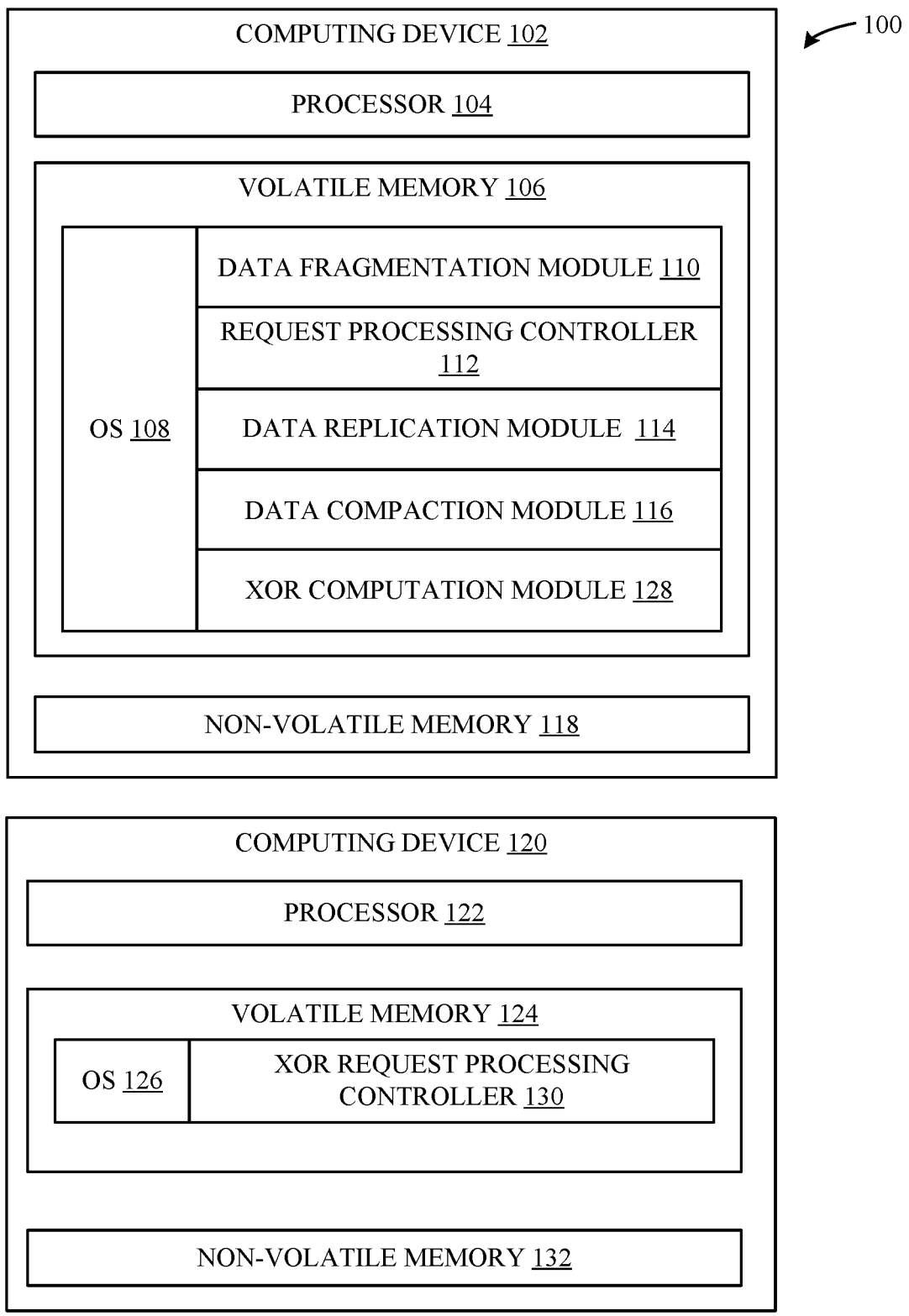
FIG. 1 illustrates an overview of a system that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

It should be noted that use of the term "data center" herein is not meant to be limiting and can include any facility at a location that houses multiple data storage computing devices, networked together, to store data including the data objects/data fragments described herein. The described data storage computing devices can include, but are not limited to, servers, network switches, firewalls, routers, and so on. Also, the data centers described herein also include sufficient power distribution systems and data network connectivity (e.g., either through conventional wired or wireless protocols) that enable the transmission of data between the various data centers described herein. Examples of wireless protocols can include protocols associated with Bluetooth signals, Near Field Communication (NFC) signals, WiFi signals, cellular signals, and so on.

It should also be appreciated that examples or descriptions of embodiments that involve the use of a data center inherently refer to a collection of data storage computing devices housed within the data center, or more specifically within a container utilized by the data center. For instance, embodiments that describe operations performed by a data center, such as the storage of data, the retrieval of data, the deletion of data, etc., inherently refer to operations performed by one or more data storage computing devices housed by the data center/container. Based on this same premise, embodiments that involve the unavailability of a data center inherently refer to the unavailability of one or more data storage computing devices that enable data to be communicated/transferred between one or more data centers.

Additionally, it should be noted that use of the term "data object" herein is not meant to be limiting and can include any type of structured data that includes one or more attributes/properties. For instance, data objects can include variables, data structures, functions, methods, pictures, movies, data blobs, and so on. Also, it should also be noted that use of the term "metadata" herein is not meant to be limiting and can include any type of data that can be used to assist in the performance the procedures described herein.

As previously described herein, conventional data replication procedures can increase the data storage costs of each data center involved in data replication processes. Essentially, each data object stored by a single data center incurs a data storage cost that can be multiplied by the number of data centers involved in the data replication process. For instance, in data storage configurations involving two data centers, the data storage costs are multiplied by a factor of two given that, for every data object received by one data center, both data centers eventually store the data object in some fashion, (e.g., a copy of the data object) as a result of the data replication process.

To cure this deficiency, the embodiments set forth herein provide various techniques that enable data centers to advantageously only store a portion of a data object when such storage is optimal. For instance, as will be described in greater detail in FIG. 2A, the described embodiments can be configured to perform data fragmentation procedures that can divide a data object into multiple data portions depending on the size of the data object. In some scenarios, if the data object is less than pre-determined size threshold criteria, then the described embodiments can allow a data center to store the data object in its entirety, given the minimal storage concerns associated with the storage of the data. However, if a data object is meets the pre-determined size threshold criteria (e.g., one megabyte of data), the described embodiments can fragment the data object into at least two separate and distinct data fragments. As will be described in greater detail in FIGS. 2G-2H, as a result of data compaction procedures, a first data fragment can be stored at one data center and a second data fragment can be stored at different data center. Notably, the aforementioned data storage costs can be significantly reduced using such procedures rather than multiplied, as is the case with conventional solutions.

Additionally, as will be described in greater detail in FIGS. 3A-3E, each data center can use replicated metadata to accurately identify the current location of each stored data fragment associated with a particular data object. For instance, in the data storage scenario described above involving two data centers, each data center can store replicated metadata that allows each data center to identify the location of the first and second data fragments. Accordingly, when an application issues a "get" command that requires data from a stored data object to be retrieved by a particular data center, the data centers can (1) communicate with each other to determine, using information included in the replicated metadata, which data center stores the data fragment that includes the requested data, and (2) perform operations in concert that enable the data center (i.e., the data center initially requested, by the application, to provide the data) to ultimately provide the application with the requested data.

In the event that a data center storing a data fragment, containing requested data, is unable to participate in the retrieval of the required data fragment stored therein, the described embodiments can use a computed exclusive or ("XOR") value to reconstruct the desired data fragment. As will be described in greater detail in FIG. 2B, an XOR value can be computed for a particular data object. In this fashion, each data fragment associated with the data object is also associated with the computed XOR value. As will be described in greater detail in FIGS. 3D-3E, the described embodiments can reconstruct the desired data fragment by using, as input, binary value representations of both (1) the computed XOR value, and (2) an available data fragment that is associated with the same data object as the desired, yet unavailable, data fragment. The reconstructed data fragment can then be used to provide the requested data. As will be readily apparent by the exemplary embodiments set forth herein, the described embodiments can reduce expensive data storage costs, while still allowing data to be efficiently stored and retrieved on an as-needed basis with minimal latency. A more detailed description of the various techniques described herein, and the manner in which they can be implemented, is provided below in conjunction with FIGS. 1, 2A-2I, 3A-3E, 4, 5, 6, and 7.

Figure 7:
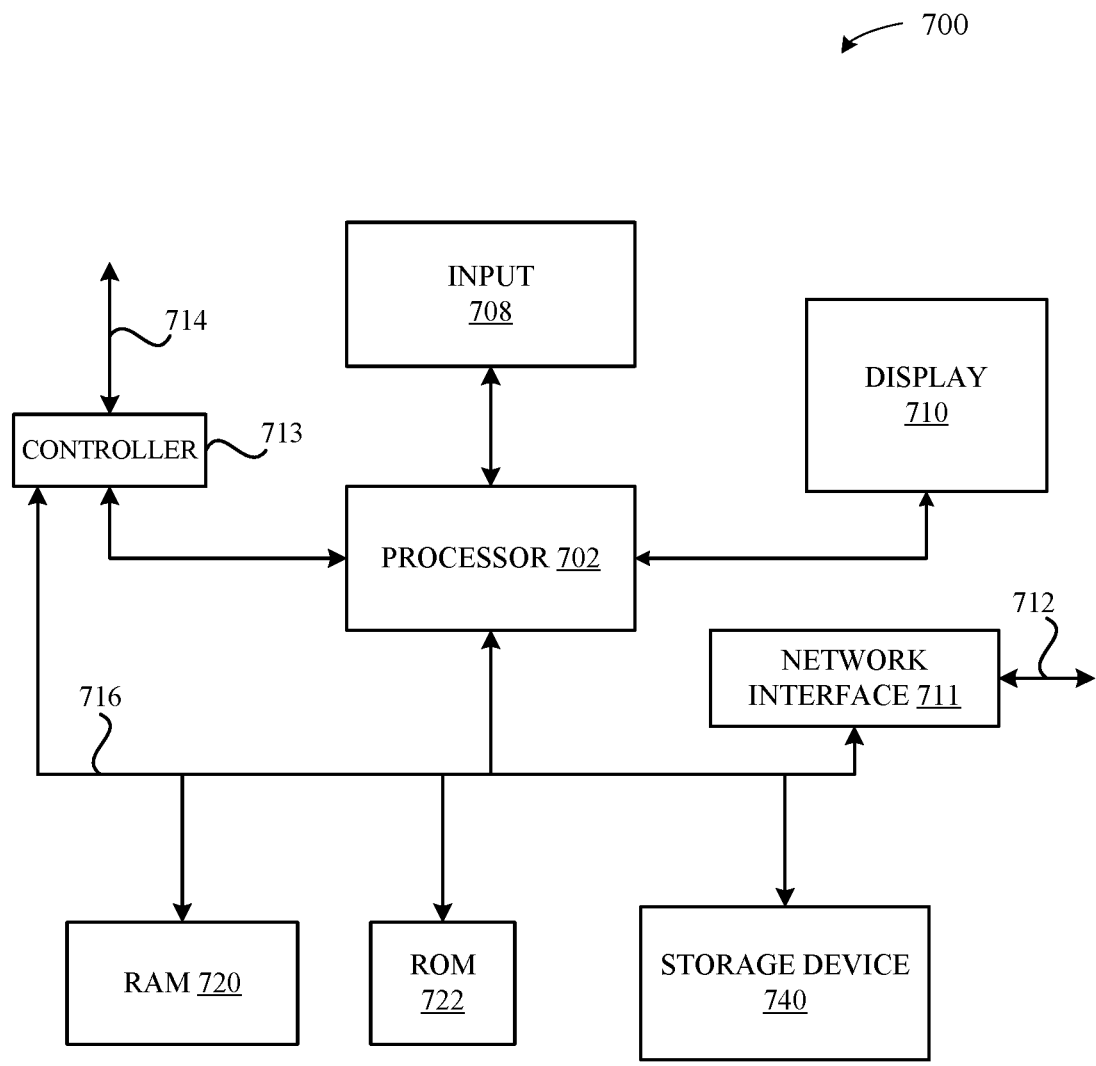
FIG. 7 illustrates a detailed view of a computing device that can be used to implement the various components described herein, according to some embodiments.

FIG. 1 illustrates a high-level overview 100 of both a computing device 102 and a computing device 120 that can each be configured to perform the various techniques described herein. According to some embodiments, the computing device 102 and the computing device 120 can be utilized by separate data centers (i.e., implemented in conjunction with one or more data storage computing devices utilized by each data center). As shown in FIG. 1, the computing device 102 can include a processor 104, a volatile memory 106 (e.g., a Random-Access Memory ("RAM")), and a non-volatile memory 118 (e.g., a storage device). It is noted that a more detailed breakdown of example hardware components that can be included in the computing device 102 (as well as the computing device 120) is illustrated in FIG. 7, and that these components are omitted from the illustration of FIG. 1 merely for simplification purposes. For example, the computing devices 102 and 120 can include additional non-volatile memories (e.g., solid state drives, hard drives, etc.), other processors (e.g., a multi-core central processing unit ("CPU")), and the like. With reference now to the computing device 102, according to some embodiments, an operating system ("OS") 108 can be loaded at the volatile memory 106, where the OS 108 can be enabled to execute a variety of applications that enable the various techniques described herein to be implemented. As described in greater detail herein, such applications can include a data fragmentation module 110, a request processing controller 112, a data replication module 114, a data compaction module 116, and an XOR computation module 128. It should be noted that the various procedures described herein can be performed asynchronous to a request issued by one or more client computing devices.

According to some embodiments, the data fragmentation module 110 includes the functionality to divide a data object, received by the computing device 102, into multiple data fragments. Each data fragment can represent a portion of a given data object. For instance, as will be described in greater detail in FIG. 2A, the data fragmentation module 110 can divide a data object into two or more separate data fragments. In this fashion, the data fragmentation module 110 can detect specific points within a given data object that enable the data fragmentation module 110 to divide the data object into different data fragments that are of equal size. By producing data fragments of equal size, the data fragmentation module 110 enables data storage capacity costs to be evenly distributed among multiple data centers that are utilized to collectively store multiple data objects. Indeed, rather than requiring each data center to store data objects in their entirety, each respective data center can, instead, incur half (or even less) of the storage capacity penalty caused by conventional data storage techniques.

According to some embodiments, the data fragmentation module 110 can divide a data object into multiple data fragments that are of different sizes. For instance, a data object can be divided into two or more separate data fragments in which a first data fragment contains more data than a second data fragment. By producing data fragments of different sizes in this fashion, the data fragmentation module 110 enables data storage capacity costs to be selectively distributed among multiple data centers. For instance, one particular data center can have the resources (e.g., hardware resources, software resources, network bandwidth, and so on) to shoulder more of a data storage load compared to another data center. Accordingly, the data center having more optimal resources can be tasked to store larger data fragments than those data centers that lack the same resources. The manner in which data fragments are stored, retrieved, and/or deleted are affected by determinations made by the request processing controller 112, which will now be discussed in greater detail.

According to some embodiments, the request processing controller 112 includes the functionality to process requests for data issued by an application, executed at a client computing device, over a data communications network. Requests processed by the request processing controller 112 can include, but are not limited to, "get" requests, "put"/"store" requests, "delete" requests, and so on. In this fashion, the request processing controller 112 can oversee operations that include the placement, retrieval, and/or deletion of data that involve the use of multiple data centers. As will be described in greater detail herein, the request processing controller 112 can coordinate the processing of certain requests by using replicated metadata stored at each data center. The replicated metadata can be produced by the data replication module 114, which will be discussed in greater detail now.

According to some embodiments, and as will be described in FIG. 2C, the data replication module 114 includes the functionality to either synchronously or asynchronously replicate data objects/fragments stored at each data center. Also, according to some embodiments, and as will be described in FIGS. 2D-2F, the data replication module 114 includes the functionality to either synchronously or asynchronously replicate metadata stored at each data center. As will be discussed in greater detail herein, the metadata stored at each data center can be replicated, by the data replication module 114, so that each data center can accurately track the location of data objects/data fragments within a particular group of data centers. Also, as will be discussed in greater detail in FIGS. 2G and 3D, replicated metadata can include information that indicates whether one or more data objects have a corresponding computed XOR value. As will be described in greater detail herein, based on information included within the replicated metadata, the data compaction module 116 can perform procedures that can maximize data storage space within each data center.

For instance, as will be discussed in greater detail in FIG. 2H, the data compaction module 116 can delete/remove at least a portion of a data object, stored at one data center, based on whether the data object is associated with a computed XOR value. Deleting portions of the data object in this fashion, in some scenarios, enables different data centers to store up to half the amount of data associated with each data object. Although each data center only stores a portion of the data object, the data centers can nevertheless still act in concert in order to satisfy a request for data associated with a desired data object, as will be described in greater detail in FIGS. 3A-3E.

Additionally, according to some embodiments, the data compaction module 116 can also perform deletion procedures associated with a "delete" request issued by an application. The data compaction module 116 can delete one or more data objects/data fragments that are no longer in use by an application or deleted by the application. For instance, in one scenario, the data compaction module 116 can delete a data object/data fragment that is associated with a file deleted by an application at a file system-level. According to some embodiments, the data compaction module 116 selectively performs deletion procedures based on timestamp data associated with a data object to determine if the data object has not been accessed/read/modified within a threshold period of time. For instance, provided a threshold period of time has been met, the data compaction module 116 can be initialized to perform the described deletion procedures on one or more data objects that meet the threshold criteria.

The data compaction module 116 can also adjust the timings of when the described deletion procedures are performed. For instance, when the data compaction module 116 detects that a particular data object is accessed periodically (e.g., every hour, day, week, and so on), the data compaction module 116 can delay the performance of the XOR deletion procedures described herein until a prescribed condition occurs. For example, in one scenario, the data compaction module 116 can delay the performance of the described deletion procedures until a user initiates an explicit command to delete a particular data object or a portion thereof.

According to some embodiments, and as will be described in greater detail herein in FIGS. 2B and 3D-3E, the XOR computation module 128 can produce a computed XOR value that can be used to reconstruct a data fragment that is stored at an unavailable data center. As will be readily apparent in FIGS. 3D-3E, using both (1) a locally-stored data fragment and (2) the computed XOR value, the XOR computation module 128 enables the described embodiments to quickly provide requested data without waiting for the unavailable data center to become available again.

With further reference to the embodiment depicted in FIG. 1, the computing device 120 includes a processor 122, a volatile memory 124, an OS 126, and a non-volatile memory 132 which can each perform functions in a manner similar to components resident on the computing device 102, such as the processor 104, the volatile memory 106, the OS 108, and the non-volatile memory 118, respectively. Similar to the OS 108 previously described herein, according to some embodiments, the OS 126 can be loaded at the volatile memory 124, where the OS 126 can be enabled to execute a variety of applications that enable the various techniques described herein to be implemented, such as an XOR request processing controller 130. As will be described in greater detail herein in FIGS. 3D-3E, the XOR request processing controller 130 includes functionality to fetch a computed XOR value for processing by the XOR computation module 128. In this fashion, one or more computed XOR values can be stored at the computed device 120 and used to create a reconstructed data fragment. It should be appreciated that the various components/modules described herein are not necessarily limited to their respective locations depicted in FIG. 1. For instance, according to some embodiments, the various components/modules depicted in FIG. 1 can be implemented entirely within the environment of the computing device 102 or the computing device 120.

Accordingly, FIG. 1 provides a high-level overview of different hardware/software architectures that can be implemented by computing devices 102 and 120 in order to carry out the various techniques described herein. A more detailed breakdown of these techniques will now be provided below in conjunction with FIGS. 2A-2I, 3A-3E, 4, 5, 6, and 7.

Figure 2A:
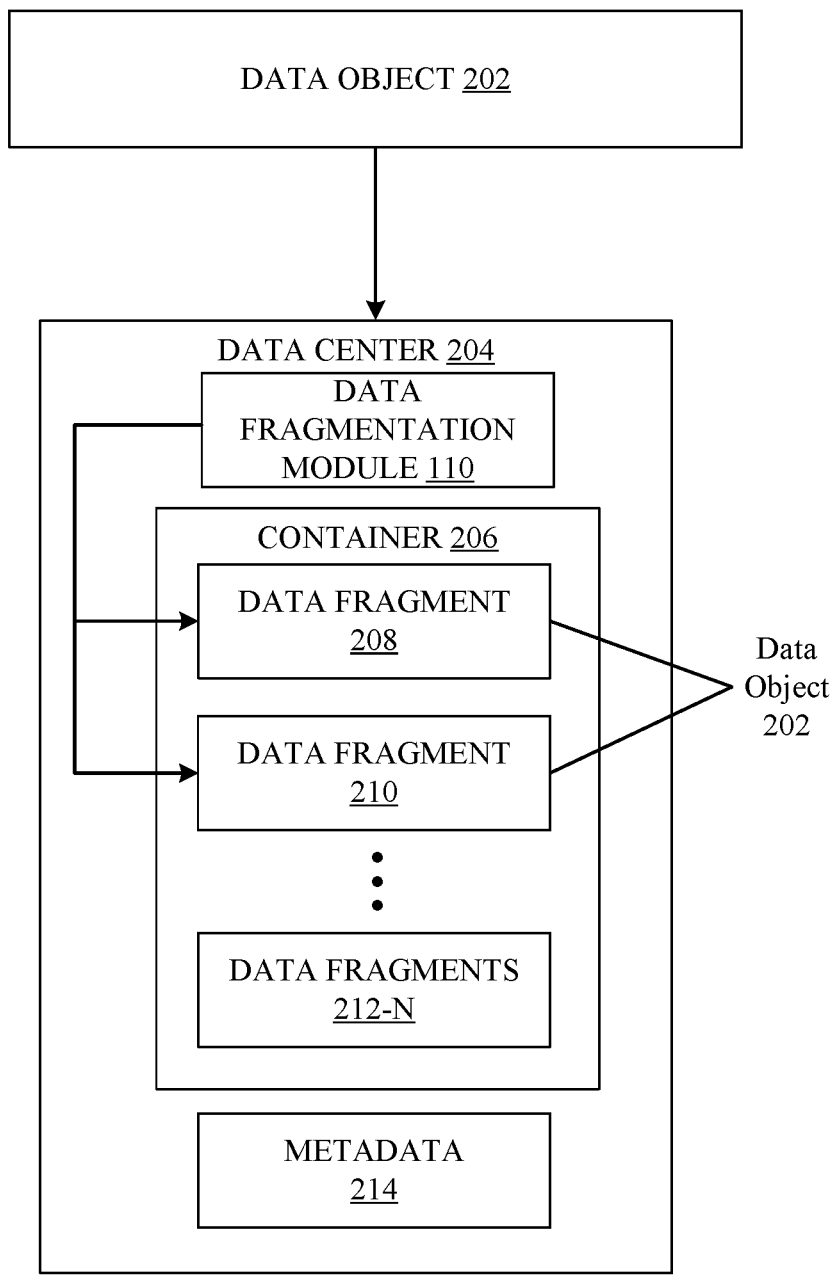
FIG. 2A illustrates exemplary data fragmentation procedures performed to efficiently store and retrieve requested data associated with one or more data objects, according to some embodiments.

For instance, FIG. 2A illustrates exemplary data fragmentation procedures performed to efficiently store and retrieve requested data associated with one or more data objects, according to some embodiments. For example, the data fragmentation procedures 200 depicted in FIG. 2A are performed in response to a "put" request, issued by an application executed on a client computing device, to the request processing controller 112 (not depicted in FIG. 2A). In this fashion, the "put"/"store" request causes a data center, such as a data center 204, to store one or more data objects, including a data object 202. According to some embodiments, the data object 202 is a data object associated with the application issuing the request via the client computing device. As further illustrated by the data fragmentation procedures 200 depicted in FIG. 2A, the data object 202 is received and then, in certain scenarios, fragmented by the data fragmentation module 110 into multiple data portions.

For instance, as depicted in FIG. 2A, the data object 202 can meet a pre-defined data size threshold that causes the data object 202 to be fragmented into two distinct data fragments, a data fragment 208 and a data fragment 210. In the scenario depicted in FIG. 2A, the data fragments 208 and 210 are produced by the data fragmentation module 110 by dividing the data object 202 at a midpoint within the data object 202. In this manner, the data fragments 208 and 210 are data portions of equal size. Using similar data fragmentation procedures, the data fragmentation module 110 produces multiple data fragments 212-N for different data objects received by the computing device 102. Furthermore, as illustrated in FIG. 2A, the data fragments 208, 210, and 212-N are stored within a container 206 at the data center 204.

It should be appreciated that, according to some embodiments, the data object 202 can be encrypted prior to the performance of the fragmentation procedures performed by the data fragmentation module 110. In this fashion, the data included in the data fragments depicted in FIG. 2A can be encrypted in a manner that allows each data fragment to maintain data integrity while stored at the data center 204. In this fashion, the privacy of data associated with each data object can be maintained while stored within the various data centers described herein.

With further reference to FIG. 2A, the data center 204 also includes metadata 214 which is stored at the data center 204. As will be discussed in greater detail herein, the metadata 214 is used by the request processing controller 112 to track the location of data associated with one or more data objects/data fragments stored at the data center 204. For instance, the metadata 214 includes data which can include, but is not limited to, (1) data specifying a list of one or more data objects/data fragments known to be stored within the container 206, (2) a size associated with each data object/data fragment, and (3) whether a particular data object/data fragment is associated with a particular computed XOR value.

It should be appreciated that, according to some embodiments, the procedures described in FIG. 2A can be performed based on certain detected conditions. For example, in one scenario, the data fragmentation module 110, associated with a particular data center, can detect time-critical conditions that require a particular data object (or a portion thereof) to be quickly retrieved. For instance, in response to a user-initiated request that requires the immediate retrieval of a data object, the data fragmentation module 110 can be configured to bypass the performance of the procedures described herein in order to quickly provide the requested data object. However, in response to a request that is not time-sensitive, such as a request initiated by a background task, the data fragmentation module 110 can be configured to perform the procedures described in FIG. 2A.

In another scenario, the data fragmentation module 110, associated with a particular data center, can detect when an application specifies whether the described embodiments should perform the procedures described in FIG. 2A. In this fashion, individual applications can be given the ability to dictate whether their respective data should (or should not be) stored using the procedures described in FIG. 2A. Accordingly, as demonstrated by the various scenarios set forth herein, the embodiments can selectively perform the described procedures so that data centers can be efficiently used to maximize their respective data storage spaces.

As will be described in greater detail herein, a computed XOR value can be used in the event that a particular data center unavailable to retrieve data associated with a particular request. In such scenarios, the computed XOR value can be used to reconstruct the desired data. For instance, FIG. 2B illustrates how the XOR computation module 128 computes XOR values for different data objects and/or their constituent data fragments, according to some embodiments. FIG. 2B depicts XOR computing procedures 216 that are performed by the XOR computation module 128 in response to a control signal received from the request processing controller 112, where the control signal indicates that the data fragmentation module 110 has completed the data fragmentation procedures 200. As depicted in the XOR computing procedures 216, the XOR computation module 128 can use a data structure, such as a data bit representation table 215, that translates the respective data fragments of a data object into corresponding binary representation values. For instance, as depicted in the data bit representation table 215, the binary representation value of the data fragment 208 includes four binary bits "0010." Additionally, as depicted in the data bit representation table 215, the binary representation value of the data fragment 210 includes four binary bits "0100." It should be appreciated that, although the data bit representation table 215 is depicted as storing only four bit binary values, the described embodiments are not limited as such and can include more or less bit values to represent a data object and/or a data fragment.

Figure 2B:
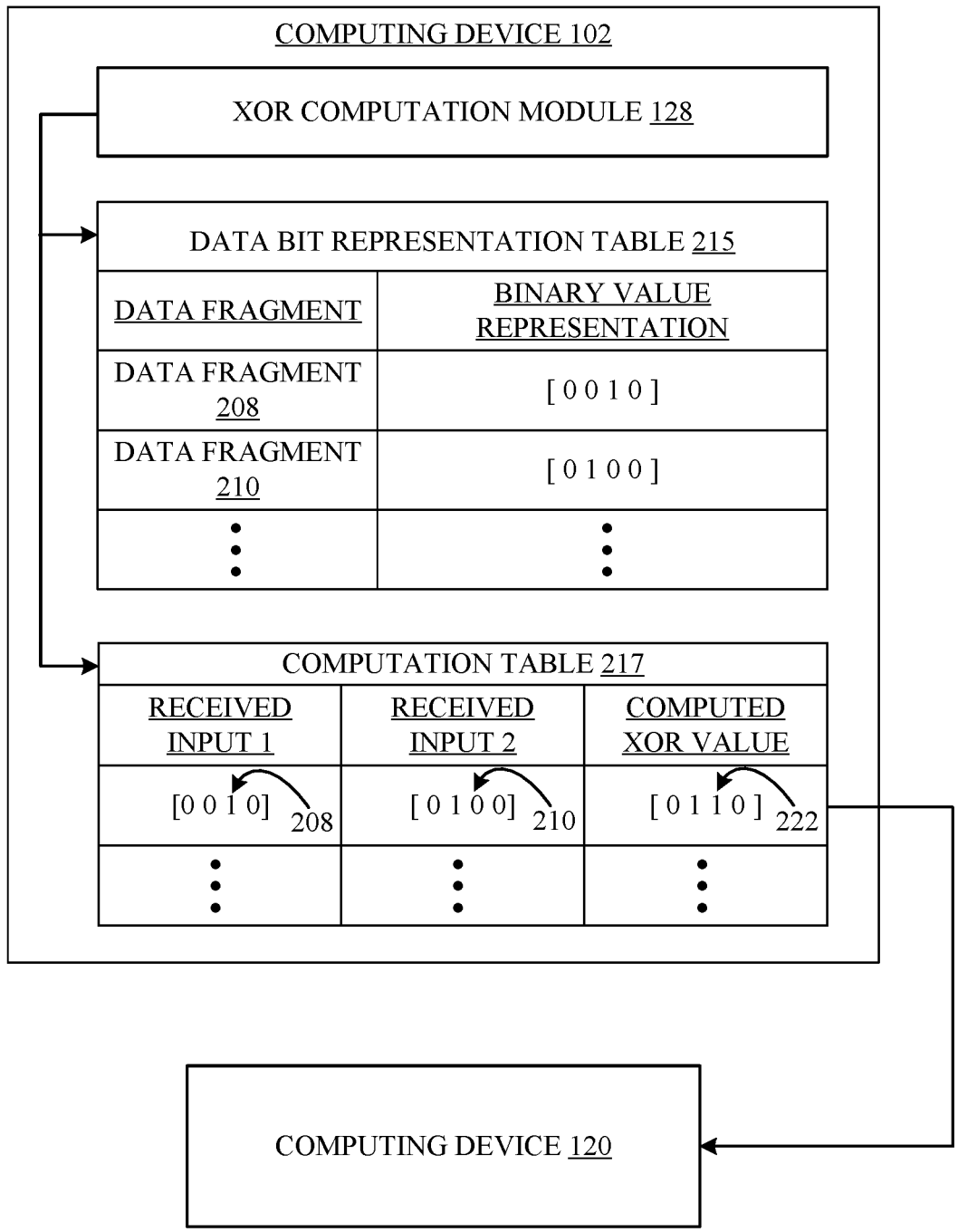
FIG. 2B illustrates exemplary XOR computations performed to efficiently store and retrieve requested data associated with one or more data objects, according to some embodiments.

As further illustrated in FIG. 2B, the XOR computation module 128 uses different binary representation values as input to produce a computed XOR value. For example, the XOR computation module 128 receives the binary bit values associated with the data fragment 208 as a first input and the binary bit values associated with the data fragment 210 as a second input. In turn, the XOR computation module 128 compares, using a data structure such as a computation table 217, an individual bit of the data fragment 208 to a counterpart individual bit (i.e., sharing a same bit position) of the data fragment 210. During the comparison procedures, the XOR computation module 128 determines an output of "0" if the bits are the same or a "1" if the bits are different. In this manner, the XOR computation module 128 performs similar bit comparisons for each bit associated with the data fragments 208 and 210. Accordingly, as depicted in FIG. 2B, performing a comparison of the bits associated with the data fragments 208 and 210 results in the XOR computation module 128 determining a computed XOR value 222 of "0110" for the data object 202. Also, as illustrated by FIG. 2B, the computed XOR value 222 can then be communicated from the computing device 102 to the computing device 120 which, as will be described in greater detailed herein, can be used by a data center configured to store one or more computed XOR values. In this fashion, and as will be described in greater detail herein in FIGS. 3D-3E, the XOR computation module 128 can use the computed XOR value 222 to reconstruct the data fragments 208/210. Moreover, according to some embodiments, the XOR computation module 128 can perform procedures that update metadata, such as metadata 214, to reflect that the data object 202 has been associated with the computed XOR value 222.

Furthermore, it should be appreciated that in configurations involving at least two data centers that each store data objects/data fragments, the described embodiments can selectively enable a specific data center to perform the XOR computing procedures 216 in order to effectively load balance data between the data centers. For instance, given that each data center utilizing the computing device 102 (e.g., the data center 204 in FIG. 2A) can perform the XOR computing procedures 216, a separate data center configured to store computed XOR values (e.g., a data center utilizing the computing device 120) can potentially receive duplicate computed XOR values. Storing duplicate computed XOR values in this fashion can potentially result in both (1) wasted computational resources for each data center performing the XOR computing procedures 216 and (2) limited storage capacity to store computed XOR values. Accordingly, the described embodiments can be configured to define conditions in which a single data center is enabled to perform the XOR computing procedures 216 and communicate any corresponding computed XOR values produced therefrom to the data center configured to store computed XOR values.

In some scenarios, the decision to enable a particular data center to perform the XOR computing procedures 216 can be based on timestamp data included in metadata. For instance, as will be described in greater detail in FIG. 2C, different data objects/fragments/metadata can be replicated and stored among different data centers, with each replicated data object/fragment receiving a same timestamp value. For example, when the data object 202 is initially stored at the data center 204 (i.e., prior to the performance of the data fragmentation procedures 200 in FIG. 2A), the data object 202 receives a timestamp value that indicates the time at which the data center 204 received the data object 202. If the timestamp value indicates an even-numbered unit of time (e.g., even-numbered milliseconds, seconds, minutes, and so on), then the data center 204 can be enabled to perform the XOR computing procedures 216 for the data object 202, while a different data center (i.e., a data center similar to the data center 204) is prevented from performing the XOR computing procedures 216.

On the other hand, if the timestamp value indicates an odd-numbered unit of time (e.g., odd-numbered milliseconds, seconds, minutes, and so on), then the different data center can be enabled to perform the XOR computing procedures 216 for the data object 202, while the data center 204 is prevented from performing the XOR computing procedures 216. Notably, the manner in which each data center is enabled/prevented from performing the XOR computing procedures 216 can be adjusted based on the number of data centers included in a particular data storage network scheme. By performing the exemplary data load balancing procedures described above, the described embodiments not only avoid both (1) wasting computational resources and (2) limiting storage capacity to store computed XOR values, but also maximize the use of available network bandwidth.

As previously described herein, one data center can receive replicated data objects/fragments stored at a different data center. For instance, FIG. 2C illustrates exemplary data replication procedures performed to efficiently store data associated with one or more data objects, according to some embodiments. In this fashion, the data center 204 can be interconnected with multiple different data centers that include the data center 218. The data center 218 includes similar components as those described herein with respect to the data center 204. For instance, the data center 218 includes a container 220 that stores one or more data objects/data fragments, such as data fragments 228-N. Additionally, the data center 218 also includes metadata 230, which is can be used to track the location of data objects/data fragments stored within the container 220.

It should be appreciated that the containers 206 and 220 are not necessarily related in any particular fashion and can store their respective data objects/data fragments independent of one another. In other words, the data stored in the containers 206 and 220 are stored in an independent manner such that each data fragment appears to be associated with a different data object. For instance, in the scenario depicted in FIG. 2C, despite both the data fragments 208 and 210 representing the entire set of data associated with the data object 202, each data fragment is managed by the data centers 204 and 218 as though no relationship exists between each data fragment. According to some embodiments, the data centers 204 and 218 are each physically located in two different locations, which can be several miles apart. For instance, in one scenario, the data center 204 is located in San Francisco and the data center 218 is located in Washington D.C. According to some embodiments, the data centers 204 and 218 communicate with each other over a data communications network, such as the Internet, a Wide Area Network (WAN), and so on.

Figure 2C:
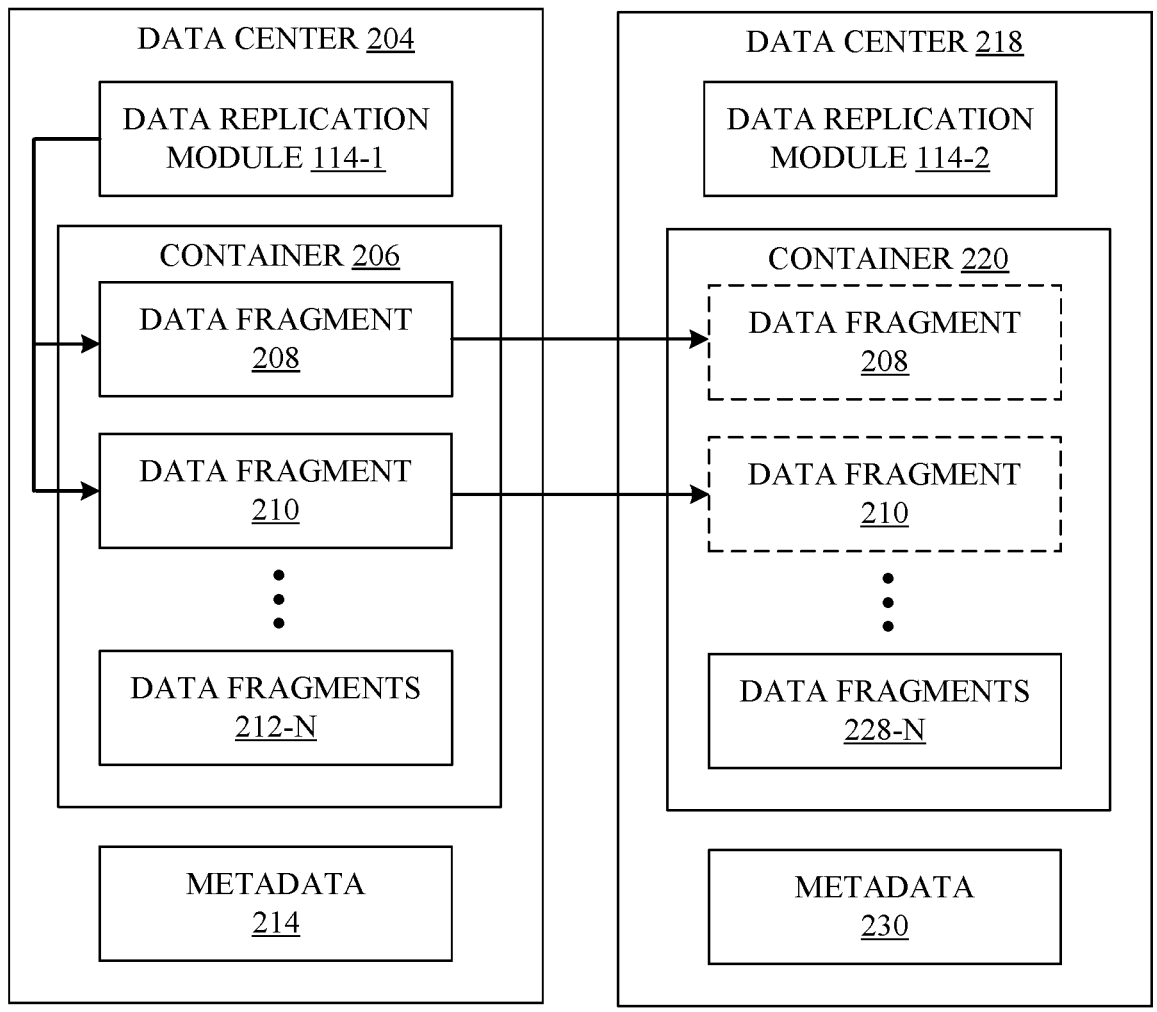
FIG. 2C illustrates exemplary data replication procedures performed to efficiently store and retrieve requested data associated with one or more data objects, according to some embodiments.

Additionally, as depicted by the data replication procedures 226 illustrated in FIG. 2C, a data replication module 114-1 can perform data replication procedures that result in portions of the data object 202 being replicated and stored at the data center 218. As illustrated in FIG. 2C, each of the data fragments 208 and 210 can be replicated, by the data replication module 114-1, and stored within the container 220 at the data center 218. Although not explicitly depicted in FIG. 2C, the data replication module 114-2 can also perform similar procedures at the data center 218. For instance, the data replication module 114-2 can replicate one or more data fragments included in the data fragments 228-N and correspondingly store each data fragment within the container 206 at the data center 204.

Additionally, as previously described herein, one data center can receive replicated metadata based on metadata stored at a different data center. Using replicated metadata, the techniques set forth herein can be utilized to efficiently determine which data center stores data requested by a client computing device so that the request can be properly serviced. As will now be described in greater detail, the replicated metadata enables the described embodiments to retrieve data associated with a particular data object from a particular data center, despite the data center initially only storing a portion of the data object, as previously described herein.

Figure 2D:
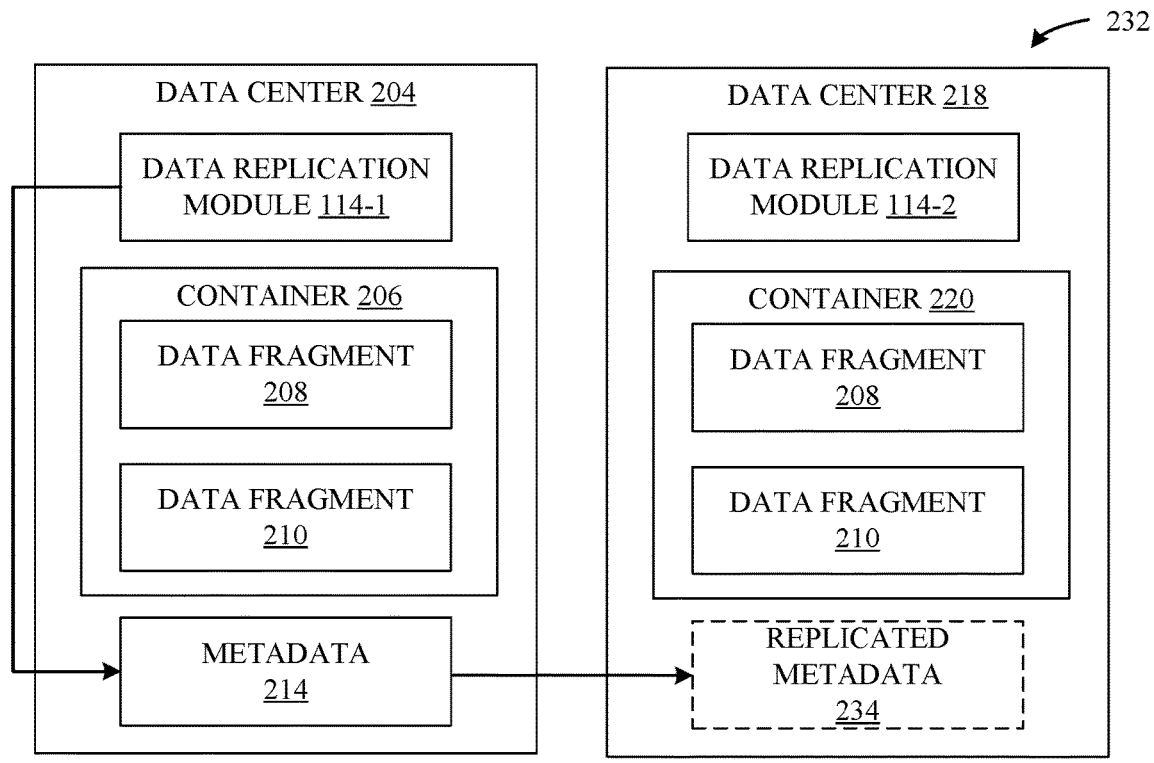
FIGS. 2D-2F illustrate exemplary metadata replication procedures performed at a data center, according to some embodiments.
Figure 2E:
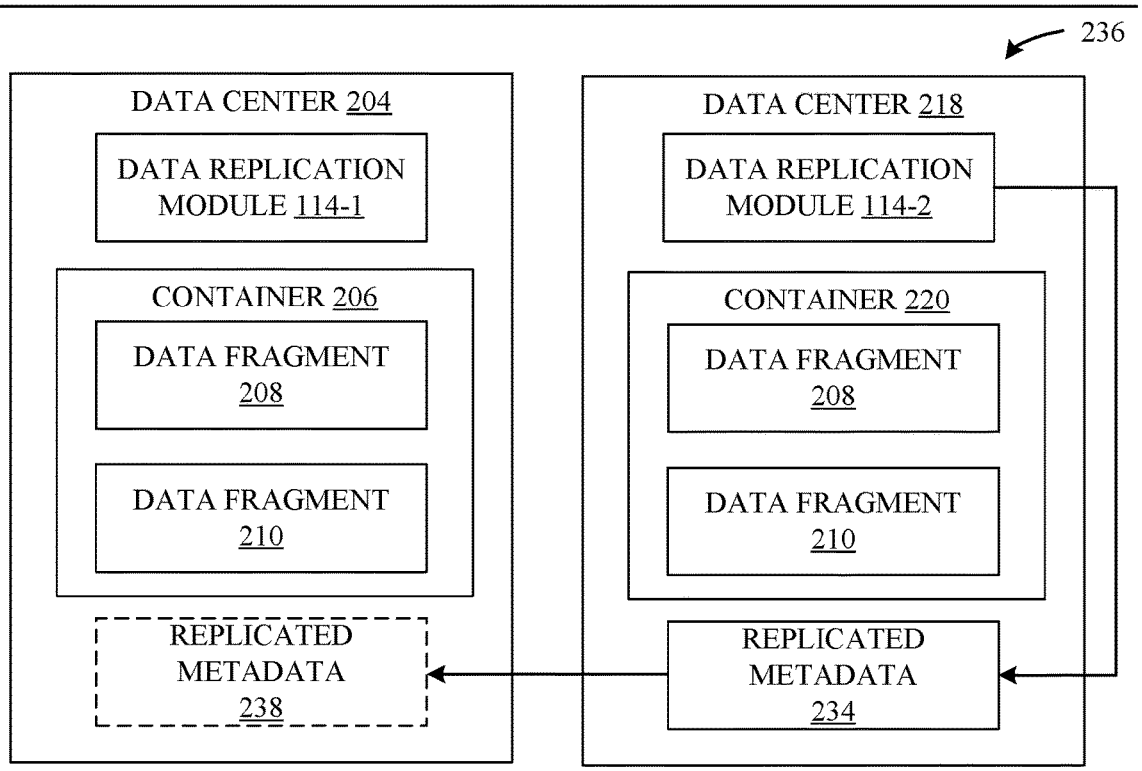
Figure 2F:
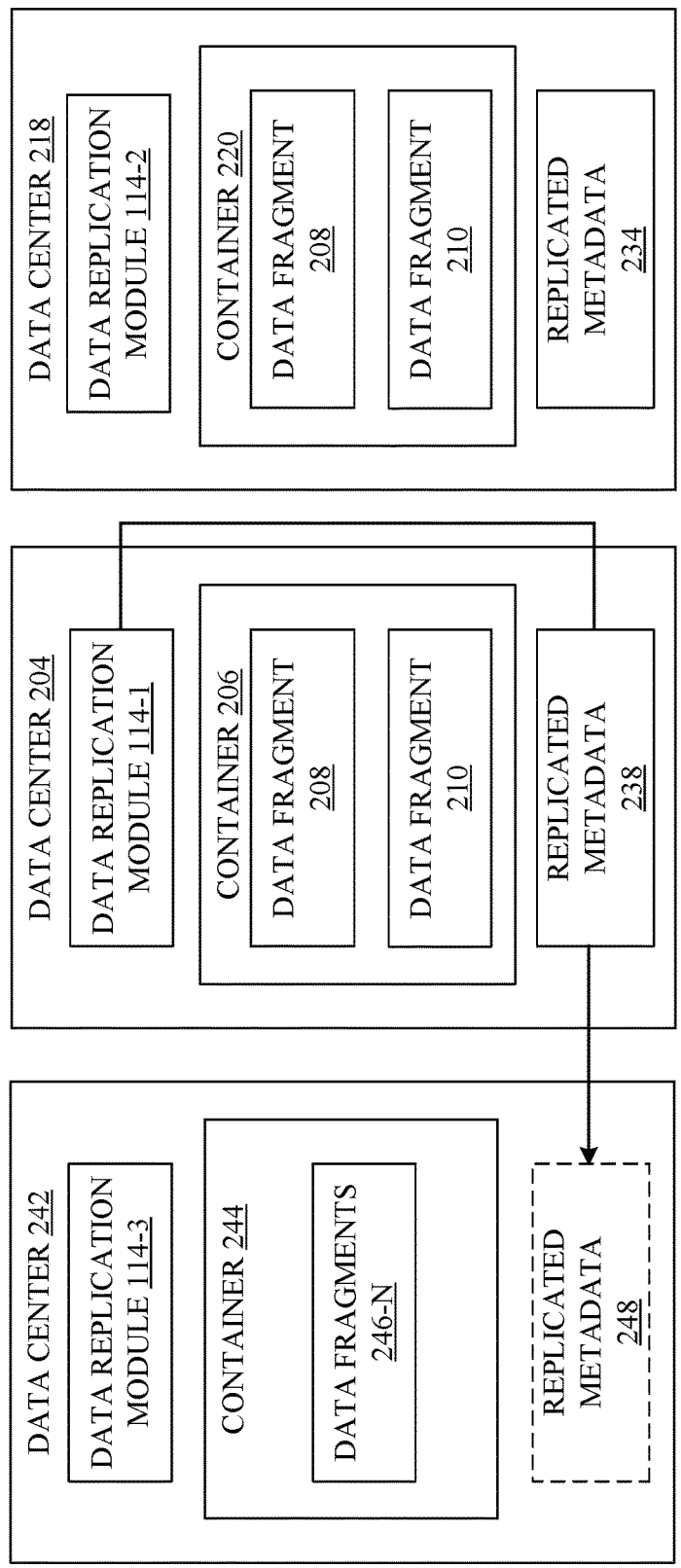

For instance, FIGS. 2D-2F illustrate exemplary metadata replication procedures performed at a data center, according to some embodiments. As previously described herein, the metadata 214 can be used to track the location of data associated with one or more data fragments stored at the data center 204. As illustrated by the metadata replication procedures 232 in FIG. 2D, metadata 214 is replicated to produce a replicated metadata 234, which is stored at the data center 218. As a result of the data replication process, the replicated metadata 234 includes a subset of the same data stored in the metadata 214.

With reference now to FIG. 2E, using procedures similar to those depicted in FIG. 2D, the data center 204 can also receive replicated metadata. For instance, with reference to the metadata replication procedures 236, the replicated metadata 234 is replicated to produce a replicated metadata 238 that is stored at the data center 204. According to some embodiments, the replicated metadata 238 includes a subset of the data stored in the replicated metadata 234. In this fashion, the replicated metadata 238 can include information that indicates the data is stored by the data center 218. Accordingly, at this point, each of the request processing controllers located at the data centers 204 and 218, respectively, is able to process a request to retrieve data corresponding to the data object 202 using the replicated metadata stored at their respective data centers, which will be discussed in greater detail in FIGS. 3A-3E.

It should be noted that the described embodiments are not limited to data storage network schemes that include only two data centers (as previously depicted in FIGS. 2C-2E). For instance, FIG. 2F illustrates how the described embodiments can store data objects/data fragments and also perform data/metadata replication procedures among three or more data centers, according to some embodiments. According to some embodiments, a newly added data center, such as data center 242, can receive one or more data fragments from the data centers 204 and 218. Additionally, similar to the procedures depicted in FIG. 2C, the data center 242 can also communicate replicated data fragments associated with the data fragments 246-N (i.e., via the data replication module 114-3) to the data centers 204 and 218.

Additionally, as previously described herein, the replicated metadata 238 includes a subset of the data stored in the replicated metadata 234 stored at the data center 218. Accordingly, using procedures similar to those depicted in FIGS. 2D-2E, the data center 242 can also receive replicated metadata. In this fashion, the data center 242 can be included within a particular data storage network scheme that includes the data centers 204 and 218 and quickly receive up-to-date metadata information from the data centers 204 and 218. For instance, with reference to the metadata replication procedures 240, the replicated metadata 238 is (again) replicated to produce a replicated metadata 248 that is stored at the data center 242. According to some embodiments, the replicated metadata 248 includes a subset of the data stored in the replicated metadata 238 stored at the data center 204. Accordingly, at this point, each of the request processing controllers located at the data centers 242, 204, and 218, respectively, is able to process a request to retrieve data corresponding to the data object 202 using the replicated metadata 248, 238, and/or 234.

It should be appreciated that, as illustrated in FIG. 2F, the container 244, similar to the containers 206 and 220, includes a separate set of one or more data objects/data fragments. Accordingly, the containers 206, 220, and 244 (and any data fragments stored therein) can bear no relationship to one another in a manner similar to the various embodiments described herein. Additionally, according to some embodiments, one or more of the data fragments 246-N can represent a portion of the data object 202. For instance, according to some embodiments, the data object 202 can be divided into more than two portions as previously described in FIG. 2A. For instance, the data object 202 can be fragmented into at least three data fragments including the data fragment 208, the data fragment 210, and one or more of the data fragments 246-N. According to some embodiments, the manner in which the data fragments 208, 210, and one or more of the data fragments 246-N are produced can be arbitrary.

Figure 2G:
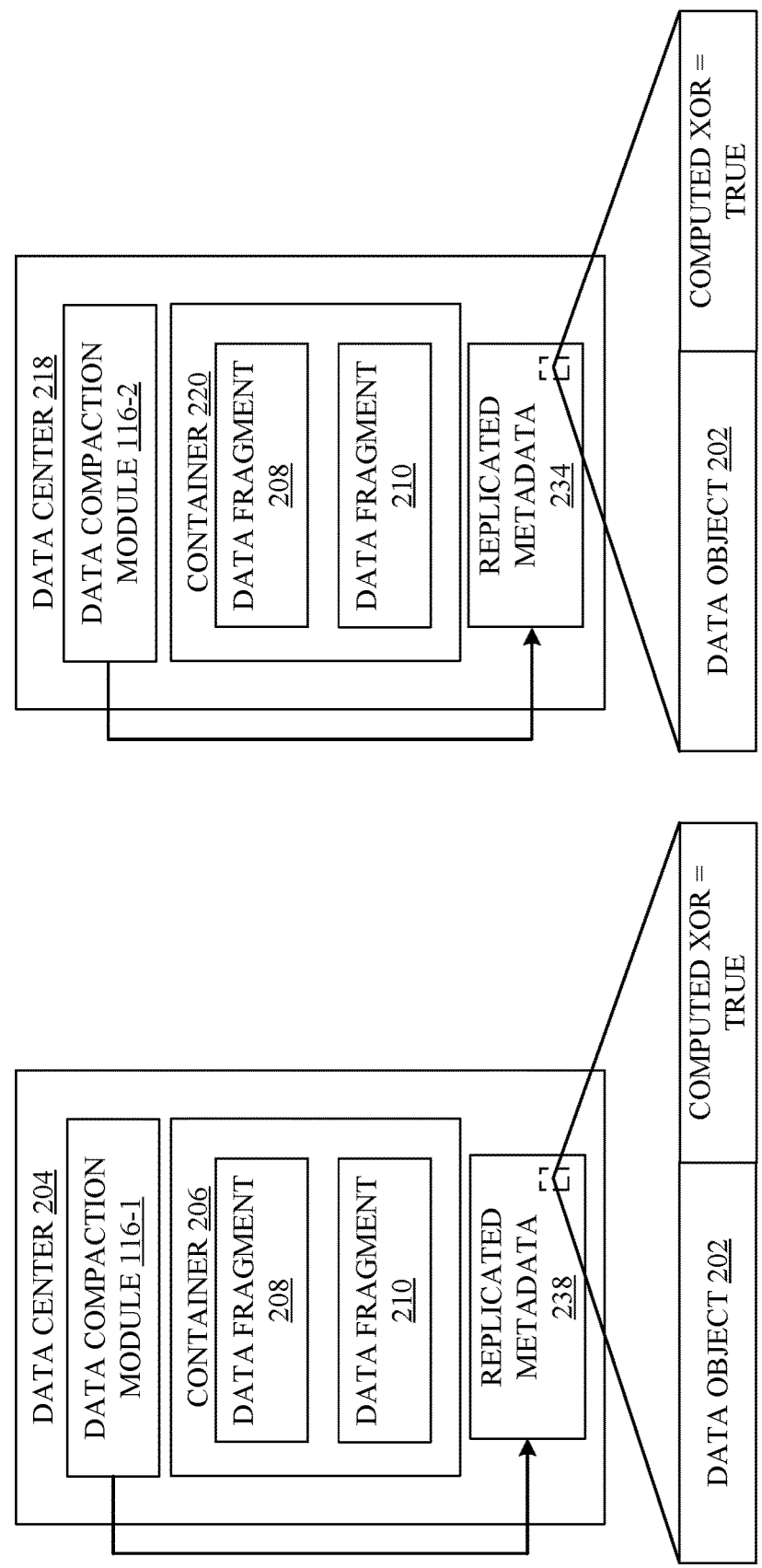
FIGS. 2G-2H illustrate exemplary data compaction procedures performed to maximize data storage at a data center, according to some embodiments.

As previously described herein, in order to efficiently maximize the data storage space of a data center, the described embodiments can perform data compaction procedures. In particular, the performance of the data compaction procedures described herein allow pertinent data to be efficiently stored/retrieved upon request. For instance, FIGS. 2G-2H illustrate exemplary data compaction procedures performed to maximize data storage at a data center, according to some embodiments. With reference now to the data compaction procedures 250 depicted in FIG. 2G, each of the data compaction modules 116-1 and 116-2 scan the metadata associated with their respective data centers 204 and 218, which includes data that indicates whether or not the data object 202 has a corresponding computed XOR value. For example, according to some embodiments, the replicated metadata 234 and 238 each include Boolean values (or similar data type values) that indicate that the data object 202 is associated with a computed XOR value (e.g., the computed XOR value 222).

Figure 2H:
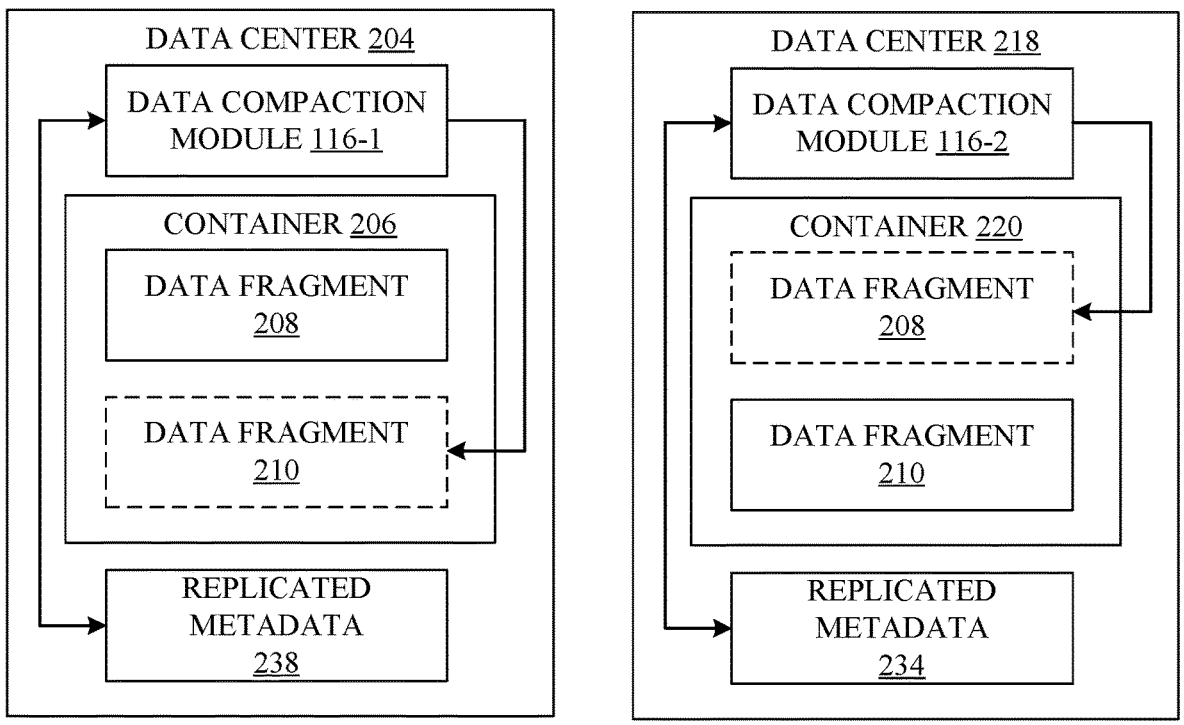

With reference now to the data compaction procedures 252 depicted in FIG. 2H, in response to identifying an association between the data object 202 and the computed XOR value 222, each of the data compaction modules 116-1 and 116-2 delete a portion of the data object 202 stored at their respective data centers. For instance, as illustrated in FIG. 2H, the data compaction module 116-1 is configured to delete a second half portion of the data object 202, such as the data fragment 210 stored at the data center 204. Additionally, the data compaction module 116-2 is configured to delete a first half portion of the data object 202, such as the data fragment 208 stored at the data center 218.

According to some embodiments, each of the data compaction modules 116-1 and 116-2 can use metadata stored at their respective data centers 204 and 218 to determine which portion of the data object 202 is a first half portion and which half is a second half portion. For instance, both the replicated metadata 234 and 238 can each include data that indicates that the data fragment 208 is the first half portion of the data object 202 and that the data fragment 210 is the second half portion of the data object 202. By deleting the data fragment 210 at the data center 204 and the data fragment 208 at the data center 218, each of the data centers 204 and 218 can store at least half the amount of data associated with the data object 202. Although the data centers 204 and 218 each only store a portion of the data object 202, as will be described in greater detail herein in FIGS. 3A-3E, the different data centers can nevertheless act in concert to satisfy a request for data associated with a desired data object.

It should be appreciated that the metadata described herein can include data that indicates that one or more data objects/data fragments have impacted by the procedures performed by the data compaction modules 116-1 and 116-2. In this fashion, each of the data centers 204 and 218 can receive up-to-date metadata that provides an accurate portrayal of the data objects/data fragments that are currently being stored by a particular data center. For instance, upon completion of the procedures performed in FIGS. 2G-2H and/or other deletion procedures described herein, any subsequent replicated metadata produced thereafter can include information that indicates the removal/deletion of a particular data object/data fragment.

As previously described herein, a separate data center is used to store computed XOR values calculated by the XOR computation module 128. Notably, using one or more data centers that are separate from the data centers 204 and 218 enables the described embodiments to quickly reconstruct any portion of a data object in response to a request for data associated with the data object. In this manner, the use of one or more separate data centers enable the described embodiments to process the request in the event that either of the data centers 204/218 cannot retrieve the data that is necessary to satisfy the request. Additionally, in some scenarios, it can be advantageous for one or more separate data centers, that store computed XOR values, to be optionally configured to perform the replication procedures described herein, as will now be described in FIG. 2I.

Figure 2I:
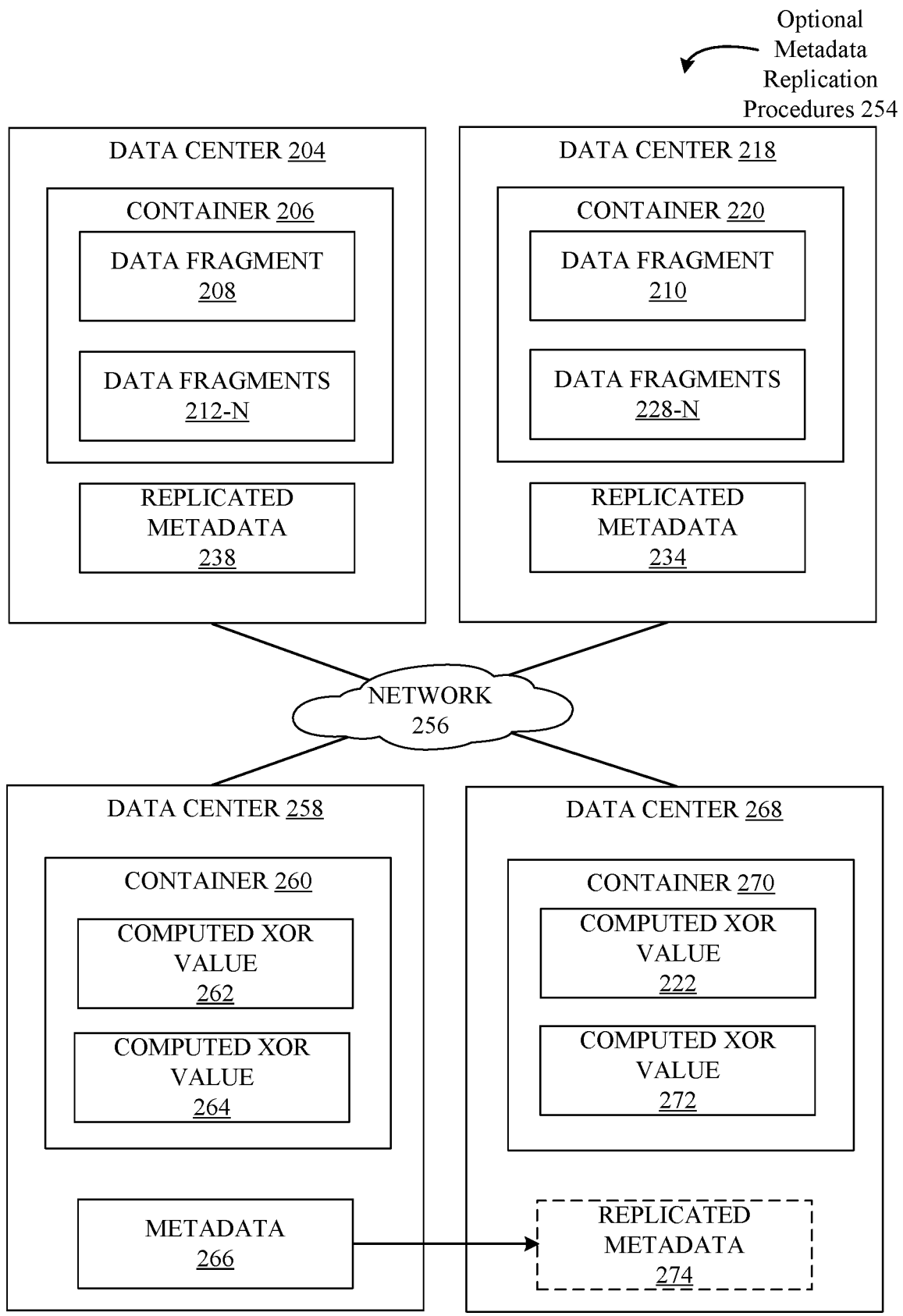
FIG. 2I illustrates exemplary metadata replication procedures that are optionally performed for different groups (or "stores") of data centers, according to some embodiments.

FIG. 2I illustrates how the described embodiments can optionally perform metadata replication procedures (e.g., optional metadata replication procedures 254) for different groups (or "stores") of data centers, according to some embodiments. For example, there are some scenarios in which the performance of metadata replication procedures between different XOR data centers is not advantageous. Such scenarios may include, for example, a data storage network configuration in which only one data center is used to perform the described XOR procedures. In such scenarios, there would be no apparent need to replicate metadata since any computed XOR values produced by the described embodiments would only be stored at one XOR data center.

However, there are also scenarios in which the performance of metadata replication procedures between different XOR data centers is advantageous, such as the scenario depicted in FIG. 2I. With reference now to the optional metadata replication procedures 254 depicted in FIG. 2I, the data centers 204 and 218 can be included in a data storage network scheme, such as a data storage network 256, with additional data centers 258 and 268 which are both configured to perform the XOR procedures described herein. In this fashion, the described embodiments can be configured to selectively enable metadata/data to be replicated between the data centers 258 and 268 in certain situations.

For instance, in the scenario illustrated in FIG. 2I, the data center 258 can store a replicated version of the computed XOR values 262 and 264 within a container 260. In this manner, the computed XOR values 262 and 264 were replicated within a container 270 and received, by the data center 258, from the data center 268. Similarly, the data center 268 can store a replicated version of the computed XOR values 222 (previously computed in FIG. 2B) and 272. In this manner, the computed XOR values 222 and 272 were replicated within a container 260 and received, by the data center 268, from the data center 258.

Notably, as illustrated in FIG. 2I, the data centers 258 and 268 can also perform metadata replication procedures, similar to those described herein with respect to the data centers 204 and 218, to accurately account for the storage locations of each computed XOR value produced by the described embodiments. For instance, as illustrated by the optional metadata replication procedures 254, the metadata 266 is replicated at the data center 258 to produce a replicated metadata 274. The replicated metadata 274 is then stored at the data center 268, as depicted in FIG. 2I.

As a result of the replication process, the replicated metadata 274 can be used to track the location of the computed XOR values 262 and 264 stored at the data center 258. In this fashion, the replicated metadata 274 includes data which can include, but is not limited to, (1) data specifying a list of one or more computed XOR values known to be stored at the data center 258, and (2) a size associated with each computed XOR value. In this manner, the replicated metadata 274 enables the data center 268 to quickly identify (e.g., using an XOR request processing controller 130 located at the data center 268) the location of the computed XOR values 262 and 264 located at the data center 258. Although not explicitly depicted in FIG. 2I, the data center 258 can receive replicated metadata from the data center 268 using similar procedures that includes information similar to that described with respect to the replicated metadata 274.

Furthermore, as depicted by the optional metadata replication procedures 254 in FIG. 2I, the metadata replication procedures performed between the data centers 258 and 268 can be limited to just those specific data centers. In this fashion, the information included in the replicated metadata 274 is not received by either the data centers 204 and 218 at any point during the performance of the optional metadata replication procedures 254. It should be appreciated that the replicated metadata 274 can include information that indicates that one or more data objects/data fragments have impacted by the procedures performed by a data compaction module 116 associated with either the data center 204 or 218.

For instance, despite the parallel nature of the replication procedures performed between the data centers 204 and 218 versus the data centers 258 and 268, the data centers 258 and 268 can nevertheless still receive asynchronous communications from either the data center 204 or the data center 218 that indicate the deletion of a data object, as performed by a data compaction module 116 described herein (e.g., the data compaction module 116-1, 116-2, etc.). In this fashion, each data center receives up-to-date metadata that provides an accurate portrayal of exactly what data objects/data fragments are currently being stored by each particular data center associated with the data storage network 256. Accordingly, the described embodiments can tailor the manner in which data replication procedures are performed between one or more data centers utilized within a given data storage network scheme.

It should be appreciated that the described embodiments can perform the described metadata replication procedures in conjunction with data object replication procedures performed between one or more data centers. For instance, as described herein, the data centers described herein can be configured to store one or more data objects in addition to one or more data fragments. In this fashion the data/metadata replication procedures described herein can be performed with data object replication procedures in either synchronous or asynchronous manner.

According to some embodiments, determinations regarding which data center stores data objects/data fragments and which data center stores computed XOR values can be based on certain scenarios or conditions. For instance, the data centers 258 and 268 can be selected to store computed XOR values, rather than store data objects/data fragments, based on operational conditions associated with the data centers 258 and 268. According to some embodiments, the hardware and/or software profiles of the data centers 258 and 268 may be more conducive to perform functions consistent with the storage of computed XOR values rather than the storage of data objects/data fragments as described herein.

According to some embodiments, network conditions surrounding the data centers 258 and 268 may also be considered when assigning the data centers 258 and 268 with the duty to store computed XOR values. For instance, poor network conditions surrounding the data centers 258 and 268 can possibly lead to reduced request response times, whereas high performing network conditions surrounding the data centers 204 and 218 can lead to excellent request response times. Given the need to respond to requests issued by an application within a reasonable amount of time, the described embodiments can use the configuration depicted in FIG. 2I in order to enable faster response times to requests issued by a client computing device.

Figure 3A:
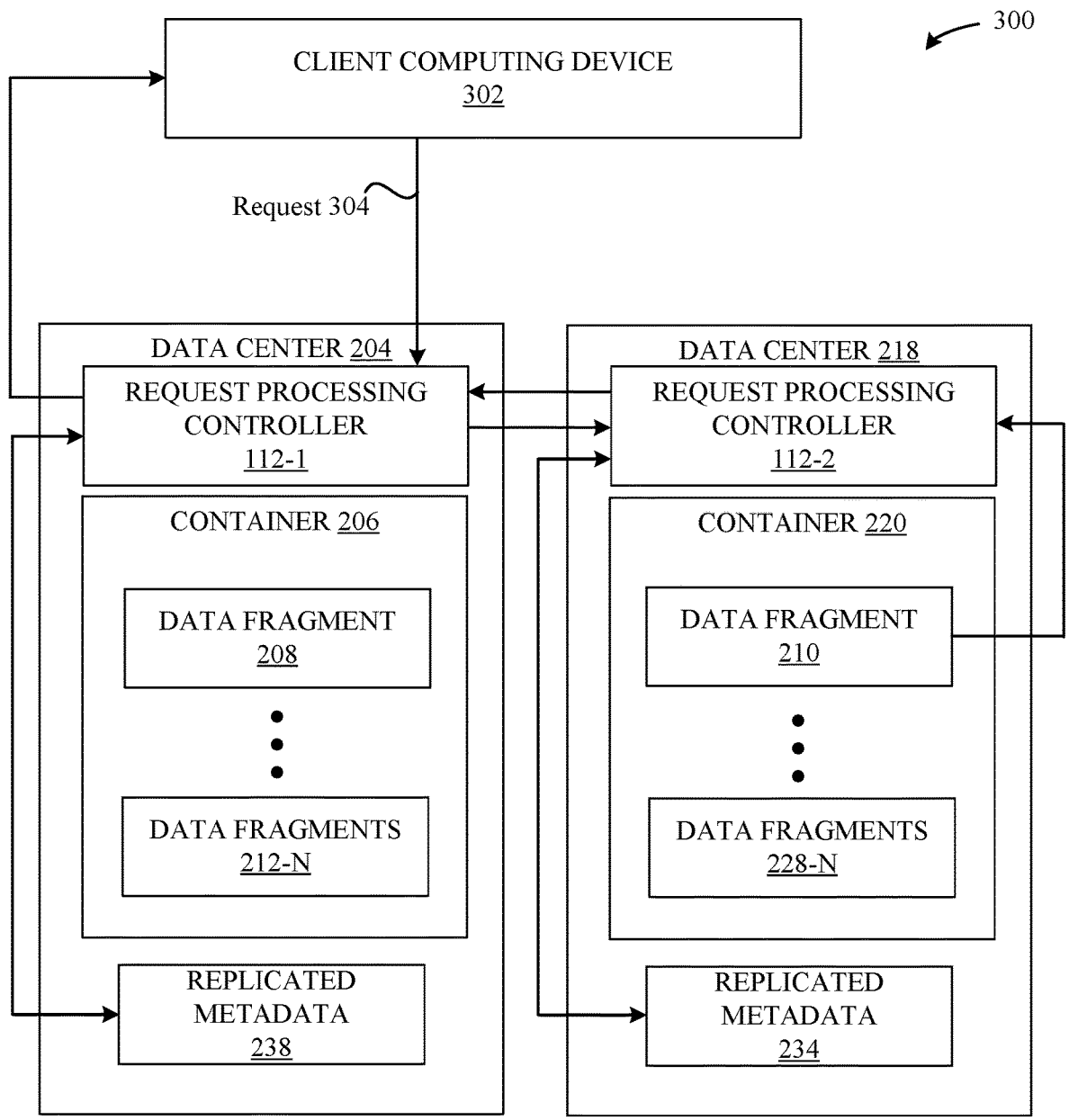
FIGS. 3A-3E illustrate exemplary data request processing procedures for retrieving data stored at a data center, according to some embodiments.

As previously described herein, in some scenarios, a client computing device can issue a "get" request that requests a specific data center to retrieve a portion of a data object. However, in these scenarios, the specified data center may not be currently storing the requested data to properly satisfy the request. Nevertheless, the described embodiments can still efficiently retrieve and communicate the requested data to the client computing device. For instance, FIGS. 3A-3E illustrate data request processing procedures for retrieving data stored at a data center, according to some embodiments. With reference now to FIG. 3A, the data request processing procedures 300 depict how metadata is analyzed in order to respond to a request to retrieve data from a particular data center, according to some embodiments. As illustrated in FIG. 3A, a client computing device 302 issues a request 304, which is received by the request processing controller 112-1, for the data center 204 to provide data included in the data fragment 210. However, at the time of issuance of the request 304 and as depicted in FIG. 3A, the data fragment 210 is not initially stored at the data center 204.

Accordingly, upon receipt of the request 304, the request processing controller 112-1 performs metadata analysis procedures that analyze the replicated metadata 238 stored at the data center 204. As previously described herein, the replicated metadata 238 includes data that, among other things, specifies a list of one or more data fragments known to be stored at the data center 218, which includes the data fragment 210. Thus, during the performance of the metadata analysis procedures, the request processing controller 112-1 identifies information within the replicated metadata 238 that indicates that the data fragment 210 is indeed stored at the data center 218, within the container 220. In turn, the request processing controller 112-1 sends communication signals to the request processing controller 112-2 that cause the request processing controller 112-2 to perform metadata analysis procedures on the replicated metadata 234. Using the replicated metadata 234, the request processing controller 112-2 identifies the location of the data fragment 210 within the container 220. In response to this identification, the request processing controller 112-2 fetches the data fragment 210 from the container 220 and sends to the data fragment 210 to the request processing controller 112-1. Upon receipt of the data fragment 210 from the request processing controller 112-2, the request processing controller 112-1, in turn, communicates the data fragment 210 to the client computing device 302.

In this manner, the request processing controllers 112-1 and 112-2 perform procedures to account for the fact that the data center 204 initially did not store the data fragment 210 when the request 304 was originally issued. Furthermore, by performing the procedures described in FIG. 3A, the request processing controller 112-1 quickly determines, using the replicated metadata 238, that the data fragment 210 is stored at the data center 218 rather than unnecessarily analyzing the entire contents of the container 206 in a fruitless attempt to locate the data fragment 210. Additionally, both the data centers 204 and 218 can continue to maximize storage space by storing only a portion of the data object 202 yet quickly retrieve the requested data associated with the request 304.

According to some embodiments, the data center 218 can communicate the data fragment 210 directly to the client computing device 302, rather than engage in communications with the data center 204 to cause the same result in the manner described in FIG. 3A. For instance, as illustrated by the data request processing procedures 306 depicted in FIG. 3B, the request processing controller 112-1 receives the request 308 (i.e., a "get" request that requests the same data as the request 304 issued in FIG. 3A) and correspondingly performs the metadata analysis procedures depicted by the embodiment illustrated in FIG. 3A.

In turn, the request processing controller 112-1 sends communication signals to the request processing controller 112-2 that cause the request processing controller 112-2 to perform metadata analysis procedures on the replicated metadata 234. Again, using the replicated metadata 234, the request processing controller 112-2 identifies the location of the data fragment 210 within the container 220. However, in response to this identification, the request processing controller 112-2 fetches the data fragment 210 from the container 220 and sends to the data fragment 210 directly to the client computing device 302 rather than sending the data to the request processing controller 112-1, as previously depicted in FIG. 3A. In this manner, the described embodiments can still perform procedures that act on behalf of the data center 204 while also providing the same computational resource benefits provided by the embodiment depicted in FIG. 3A. In addition, the embodiment described in FIG. 3B also provides the added benefit of conserving network bandwidth by not communicating the data fragment 210 back to the data center 204 in order to satisfy the request 308.

Figure 3B:
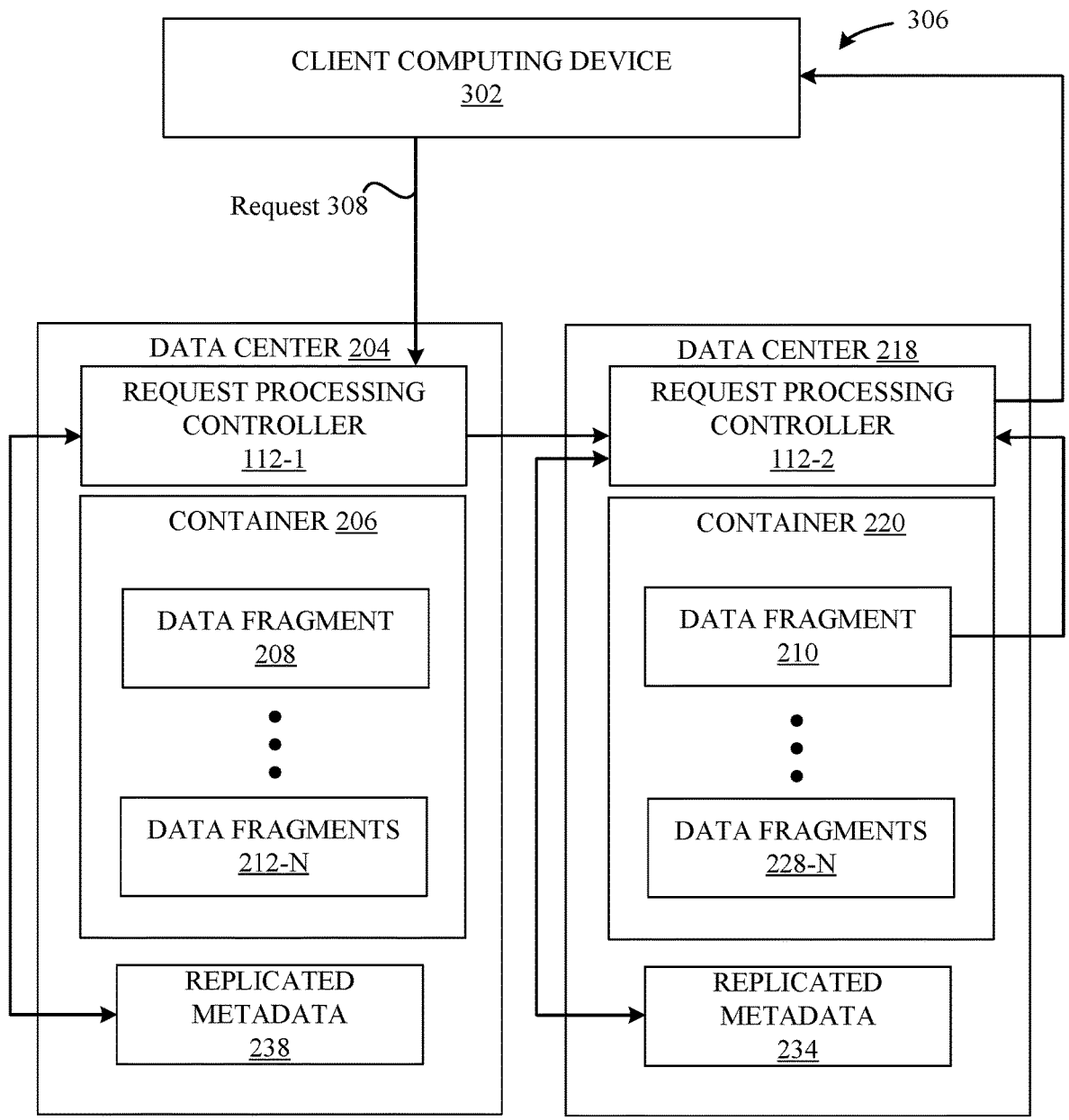

In some scenarios, a data center can store a portion of the data object 202 that is requested by the client computing device 302, rather than having to communicate with a different data center to retrieve the requested data, as previously depicted in FIGS. 3A-3B. In such scenarios, the described embodiments can efficiently retrieve and communicate the requested data to the client computing device 302. For instance, with reference now to the data request processing procedures 310 depicted in FIG. 3C, the client computing device 302 issues a request 312, which is received by the request processing controller 112-1, for the data center 204 to provide data included in the data fragment 208. Upon receipt of the request 312, the request processing controller 112-1 performs metadata analysis procedures that analyze the replicated metadata 238 stored at the data center 204. During the performance of metadata analysis procedures, the request processing controller 112-1 identifies information within the replicated metadata 238 that indicates that the data fragment 208 is stored at the data center 204 within the container 206. In response to this identification, the request processing controller 112-1 fetches the data fragment 208 from the container 206 and sends to the data fragment 208 directly to the client computing device 302.

In this fashion, the request processing controller 112-1 can quickly recognize, using the replicated metadata 238, that the data fragment 208 is stored at the data center 204 rather than unnecessarily engage in communications with the data center 218 to identify the location of the requested data and consume network bandwidth in the process. Additionally, the data centers 204 and 218 can continue to maximize storage space by storing only a portion of each data object yet quickly retrieve the requested data associated with the request 312.

Figure 3C:
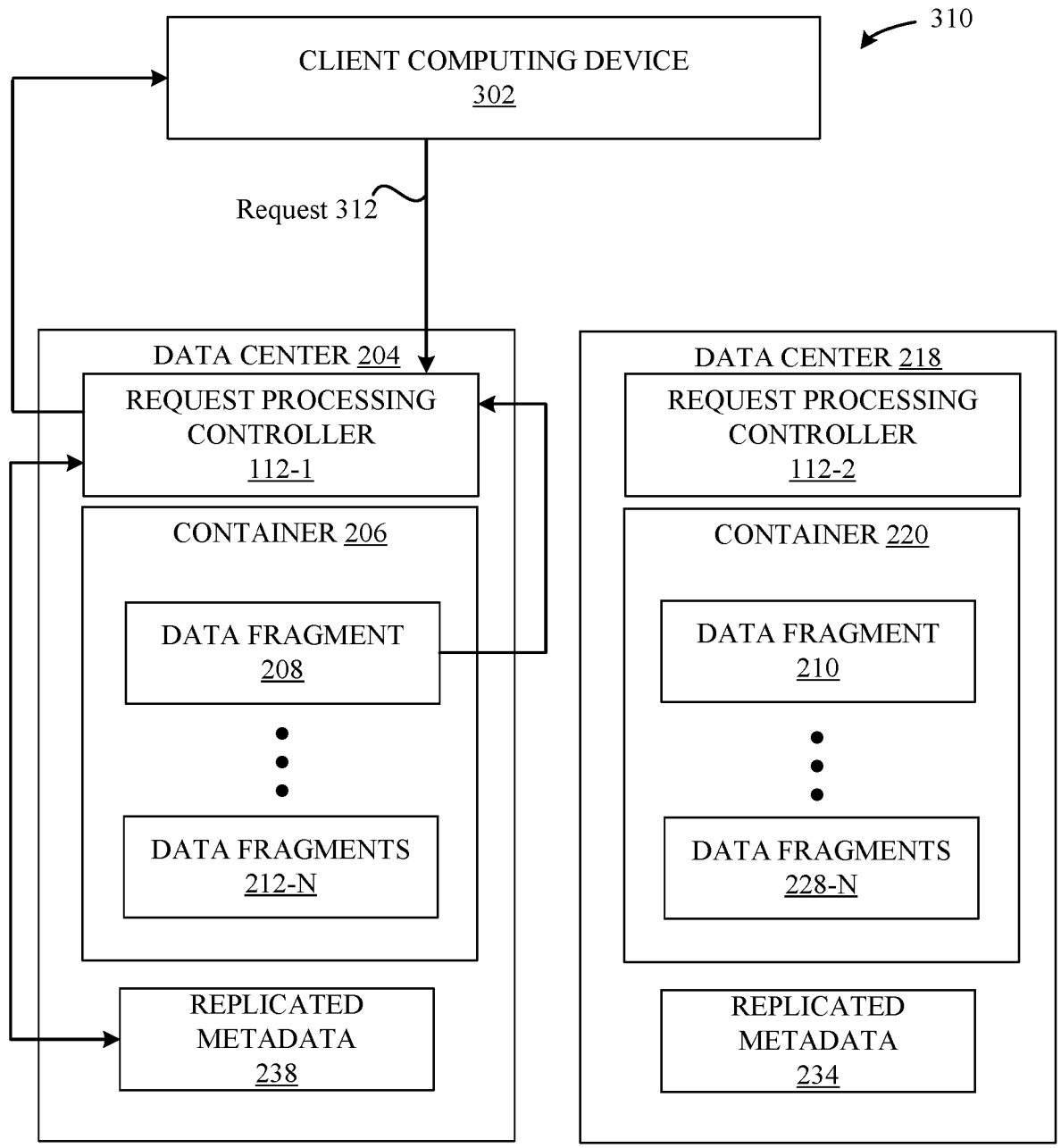

Accordingly, using the procedures described in FIGS. 3A-3C, the described embodiments are able to quickly locate, within either the data centers 204 and 218, requested data associated with the data object 202 by using the replicated metadata 238 and 234 given that both the replicated metadata 238 and 234 are synchronized at this point. However, as previously described herein, there may be scenarios in which a data center storing the requested data is not in an active computing state. In such scenarios, the described embodiments can nevertheless produce the requested data by accessing a computed XOR value, which will be described in greater detail now in FIGS. 3D-3E.

Figure 3D:
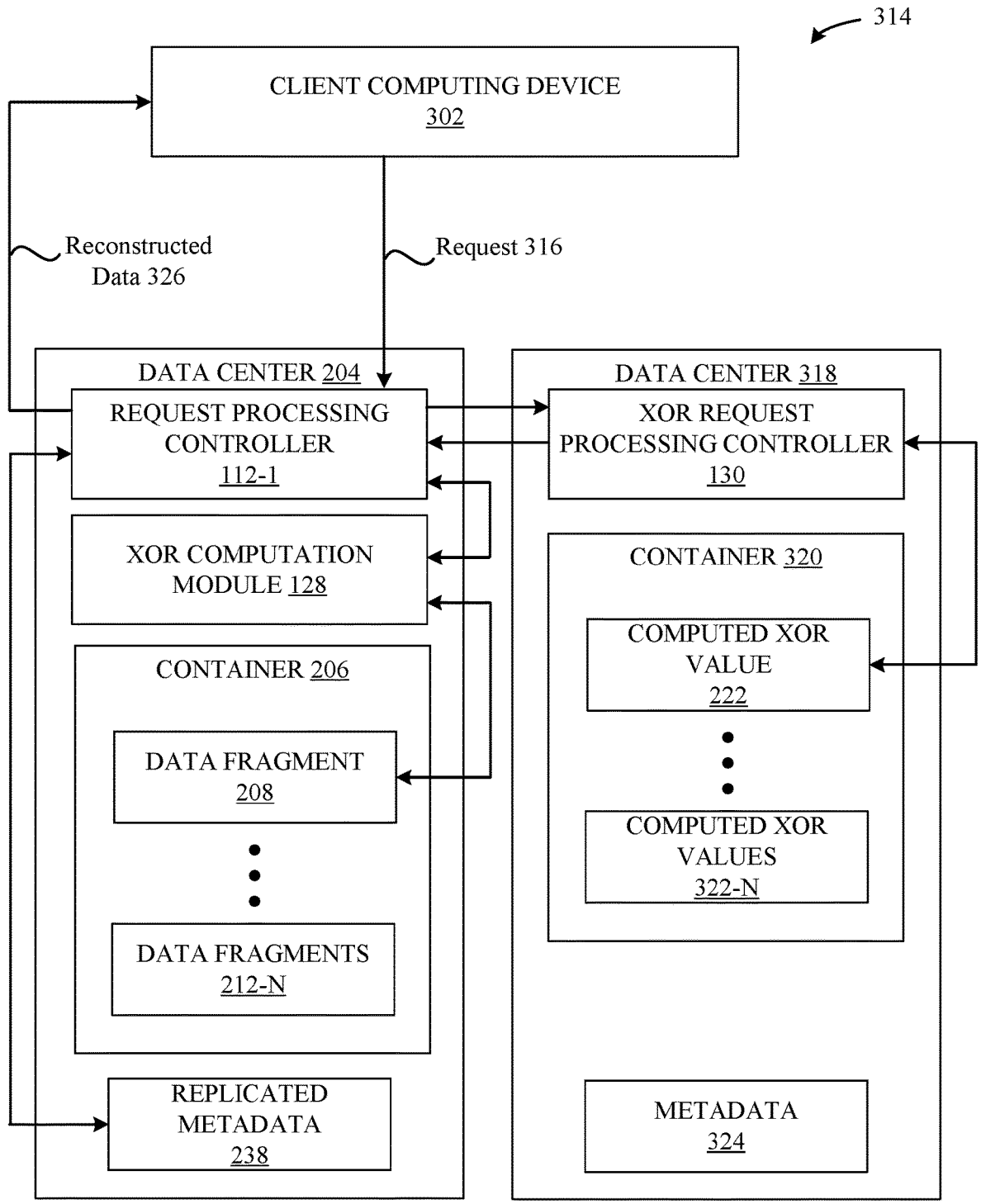
Figure 3E:
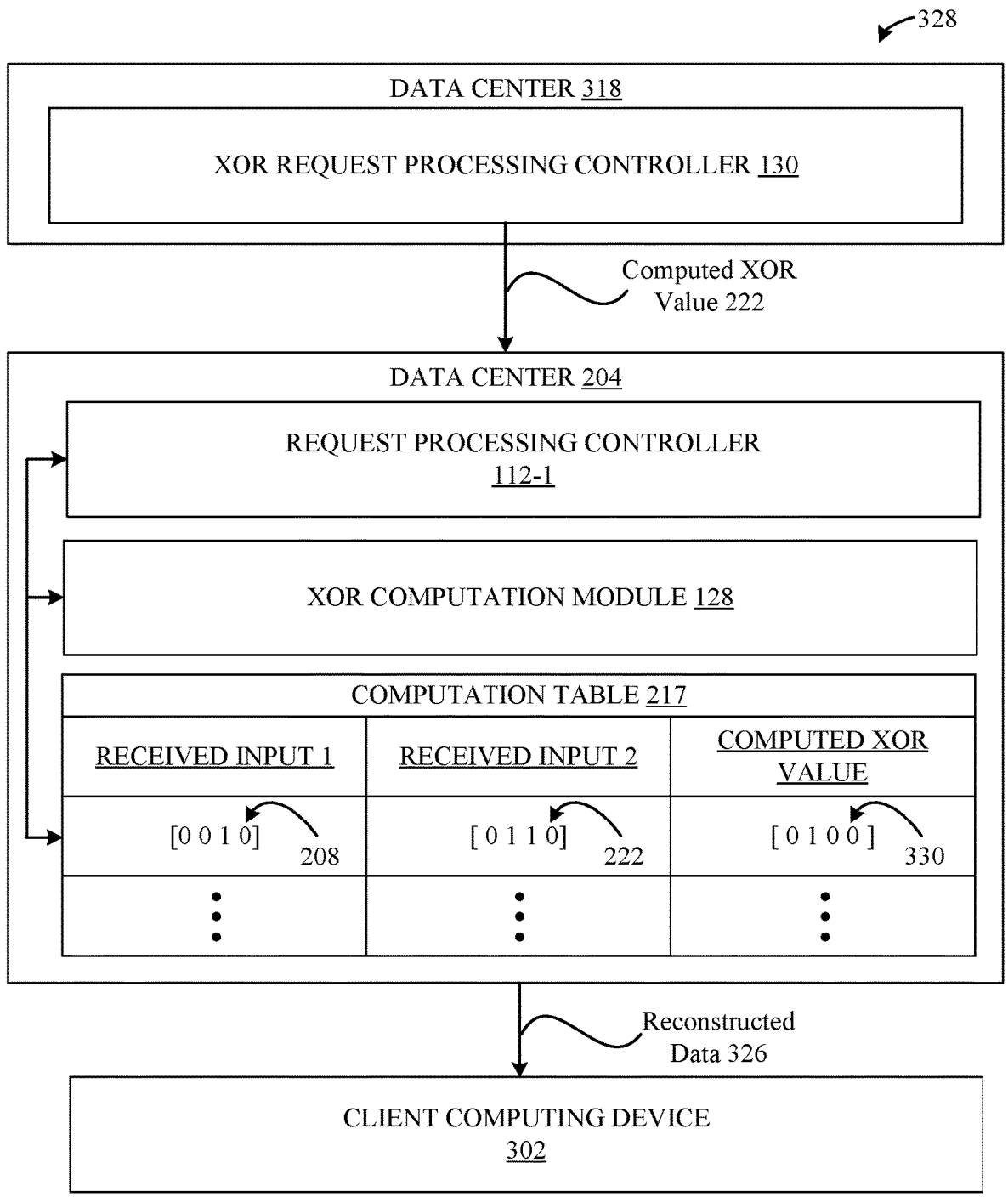

FIGS. 3D-3E illustrate exemplary data reconstruction procedures that can be performed in the event that a data center is unable to respond to a request to retrieve data, according to some embodiments. As illustrated by the data reconstruction procedures 314 depicted in FIG. 3D, the client computing device 302 issues a request 316, which is received by the request processing controller 112-1, for the data center 204 to provide data included in the data fragment 210. As illustrated in FIG. 3D, the data center 204 does not currently store the data fragment 210. Upon receipt of the request 316, the request processing controller 112-1 performs metadata analysis procedures that analyze the replicated metadata 238 stored at the data center 204. When performing metadata analysis procedures, the request processing controller 112-1 identifies information within the replicated metadata 238 that indicates that the data fragment 210 is stored at the data center 218 (not depicted).

However, in the scenario illustrated in FIG. 3D, the data center 218 is in a computing state in which the data fragment 210 cannot be accessed due to the data center 218 being offline. In some scenarios, the reason for the data center 218 being offline can be due to a loss of network connection, a loss of sufficient power to the data center 218, damaged hardware components, corrupt data, and so on. In response to detecting that the data center 218 is offline, the request processing controller 112-1, as illustrated in FIG. 3D, sends communication signals to a XOR request processing controller 130 located at a different data center configured to store one or more computed XOR values, such as the data center 318. Notably, in addition to the XOR request processing controller 130, the data center 318 also includes (1) a container 320 that stores computed XOR values 322-N and (2) metadata 324 that can be used to track the location of data stored within the container 320. In response to the signals received from the request processing controller 112-1, the XOR request processing controller 130 retrieves the computed XOR value 222, associated with the data object 202, and communicates the computed XOR value 222 to the data center 204 for further processing in order to provide a reconstructed version of the data fragment 210 (i.e., the reconstructed data 326) to the client computing device 302, as will now be described in FIG. 3E.

As illustrated by the data reconstruction procedures 328 depicted in FIG. 3E, the XOR request processing controller 130 communicates the computed XOR value 222 to the request processing controller 112-1 which, in turn, communicates the data to the XOR computation module 128 for further processing. In response, the XOR computation module 128 uses a currently available data fragment associated with the data object 202 to generate a new computed XOR value, which represents the data fragment 210. In turn, the XOR computation module 128 can send communication signals to the request processing controller 112-1 to retrieve the data fragment 208 which, like the data fragment 210, is associated with the data object 202.

In turn, the request processing controller 112-1 (1) performs metadata analysis procedures using the replicated metadata 238 and (2) identifies information within the replicated metadata 238 that indicates that the data fragment 208 is indeed stored at the data center 204 within the container 206. In response to this identification, the request processing controller 112-1 fetches the data fragment 208 from the container 206 and sends the data fragment 208 to the XOR computation module 128. As depicted in FIG. 3E, using the computation table 217, the XOR computation module 128 uses the binary bit values associated with the data fragment 208 (i.e., the four-bit binary value "0010") as a first input and the binary bit values associated with the computed XOR value 222 (i.e., the four-bit binary value "0110") as a second input.

In turn, the XOR computation module 128 compares, using the computation table 217, each individual bit of the data fragment 208 to a counterpart individual bit of the computed XOR value 222. After performing a comparison of the bits associated with the data fragment 208 and the computed XOR value 222, the XOR computation module 128 produces a computed XOR value 330 of "0100." As previously depicted in FIG. 2B, the value "0100" is also a binary value representation of the data fragment 210. Accordingly, to satisfy the request 316, the data fragment 210 can be communicated, via the request processing controller 112-1, back to the client computing device 302 in the form of reconstructed data 326.

Accordingly, using the procedures described in FIGS. 3D-3E, the described embodiments use the stored computed XOR value 222 to account for the fact that (1) the data center 204 initially did not store the data fragment 210 when the request 316 was originally issued, and (2) the request processing controller 112-1 could not otherwise access the data center 218 to enable the data center 204 to respond to the request 316. By performing the procedures described in FIGS. 3D-3E, the described embodiments engage in procedures involving the use of the computed XOR value 222 and only a portion of the data object 202 in order to quickly satisfy the request 316, rather than wait for the data center 218 to return to an active status.

It should be appreciated that, according to some embodiments, the reconstructed version of the data fragment 210 can be immediately encrypted upon reconstruction. In this fashion, the reconstructed version of the data fragment 210 can be decrypted prior to the requested data being received by the client computing device 302. In this fashion, the integrity/privacy of data associated with each data object can be maintained right up to the point in at which the client computing device 302 receives the requested data.

Additionally, it should be appreciated that the described embodiments are not limited to processing requests that solely require data fragments to be retrieved. In some scenarios, the described embodiments can also process requests that require an entire data object to be fetched from one or more data centers. For instance, the described requests in FIGS. 3A-3E can each require both the data fragments 208 and 210 to be retrieved, in combination, in response to a single request. In this scenario, the data centers 204 and 218 can both act in concert to satisfy the request in a manner that is consistent with the procedures described herein.

For instance, according to some embodiments, the request processing controller 112-1 can receive a request that requires both data fragments 208 and 210 to be retrieved. In the various scenarios depicted herein, the data fragment 208 is stored at the data center 204 and the data fragment 210 is stored at the data center 218. In response to the request, the request processing controller 112-1 can perform the described procedures that enables the data center 204 to communicate the first portion of the data object 202, the data fragment 208, to the client computing device 302.

As the data associated with the data fragment 208 is being transmitted to the client computing device 302, the request processing controller 112-1 can detect when a last bit of the data fragment 208 is approaching. In response to this detection, the request processing controller 112-1 can asynchronously send communication signals to the request processing controller 112-2 that causes a last portion of the data object 202, the data fragment 210, to be received by the client computing device 302 using the described procedures. In this fashion, the client computing device 302 detects minimal latency during the processing of a request that requires all data associated with the data object 202 to be retrieved.

Additionally, according to some embodiments, the described embodiments can configure the various data centers described herein to include erasure encoding capabilities that enable their respective containers to store encoded redundant data portions. Using the encoded redundant portions (or parity data), the described data centers can initially reproduce a data object/data fragment locally within their respective containers prior to engaging in the data reconstruction procedures described herein. In this fashion, the described embodiments can be configured to resort to the data reconstruction procedures described in FIGS. 3D-3E as a last resort option to satisfy a request.

Furthermore, according to some embodiments, the entirety of the data associated with the data object 202 can be retrieved using only a computed XOR value. For instance, according to some embodiments, the client computing device 302 can engage in direct communications with a data center utilizing the XOR computation module 128/the XOR processing controller 130 (e.g., the data centers 258, 268, and 318) to perform the described data reconstruction procedures. In this fashion, client computing device 302 can receive a reconstructed version of the data object, such as the data object 202, using a stored computed XOR value, such as the computed XOR value 222. In this manner, both the data centers 204 and 218 can be bypassed in order to reconstruct the data object 202.

Figure 4:
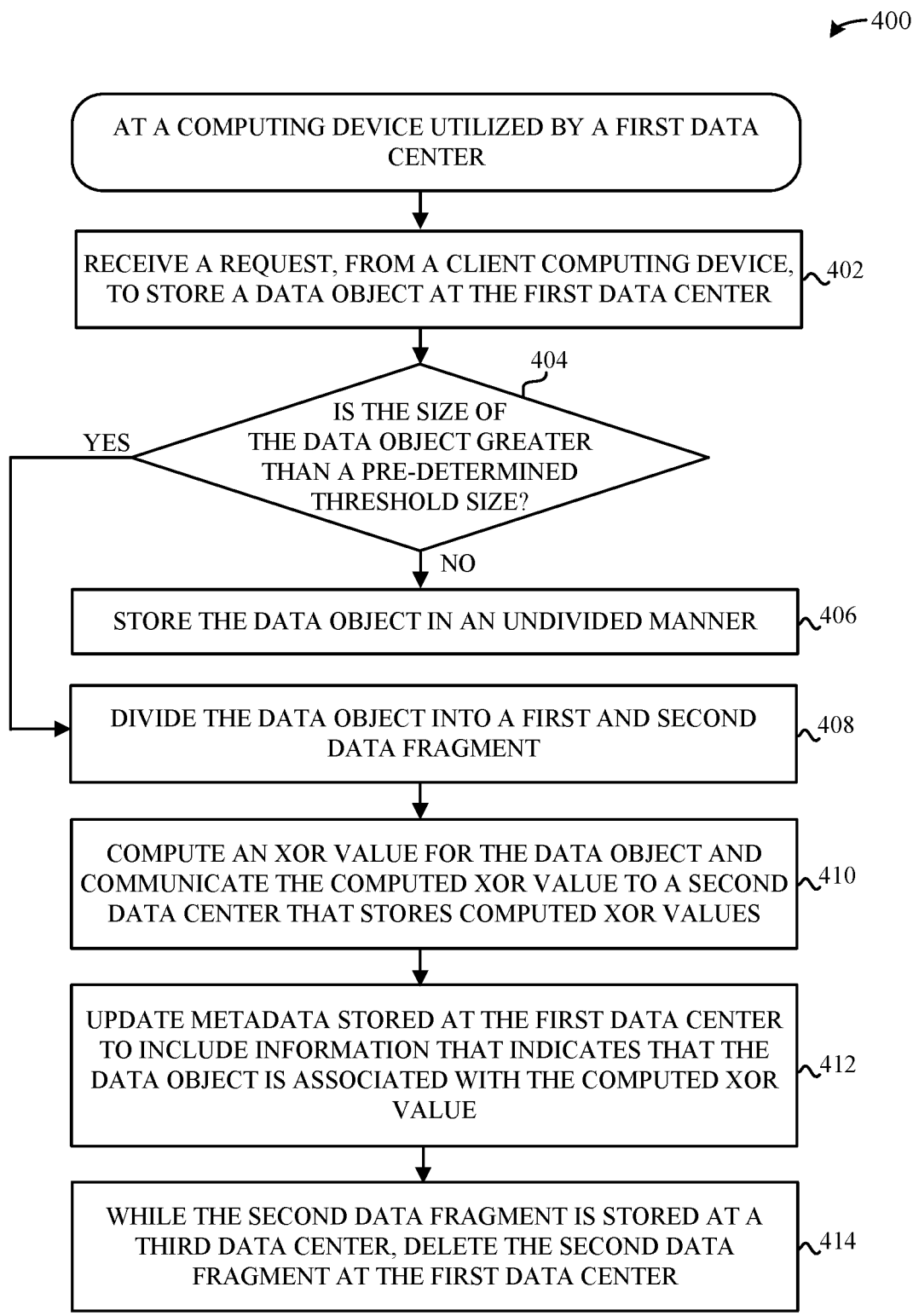
FIG. 4 illustrates an exemplary method for processing a request to store data at a data center, according to some embodiments.

FIG. 4 illustrates a method 400 for processing a request to store data at a data center, according to some embodiments. As shown in FIG. 4, the method 400 can be performed at a computing device (e.g., the computing device 102) utilized by a first data center (e.g., the data center 204). The computing device is operable to receive a request, issued by an application executed at a client computing device (e.g., the client computing device 302), over a data communications network. The method 400 begins at step 402, where a request processing controller receives a request, from a client computing device, to store a data object at the first data center.

Next, at step 404, a data fragmentation module determines whether the size of the data object is greater than a pre-determined threshold size. If the data fragmentation module determines that the size of the data object is greater than the pre-determined threshold size, then the data fragmentation module divides the data object into a first and second data fragment, as detailed at step 408. Otherwise, the data object is stored at the first data center in an undivided manner, as detailed at step 406.

Next, at step 410, the XOR computation module computes an XOR value for the data object and communicates the computed XOR value to a second data center that stores computed XOR values. Next, at step 412, the XOR computation module updates metadata stored at the first data center to include information that indicates that the data object is associated with the computed XOR value. Finally, at step 414, while the second data fragment (e.g., a replicated version of the second data fragment) is stored at a third data center (e.g., the data center 218), the second data fragment is deleted at the first data center.

Figure 5:
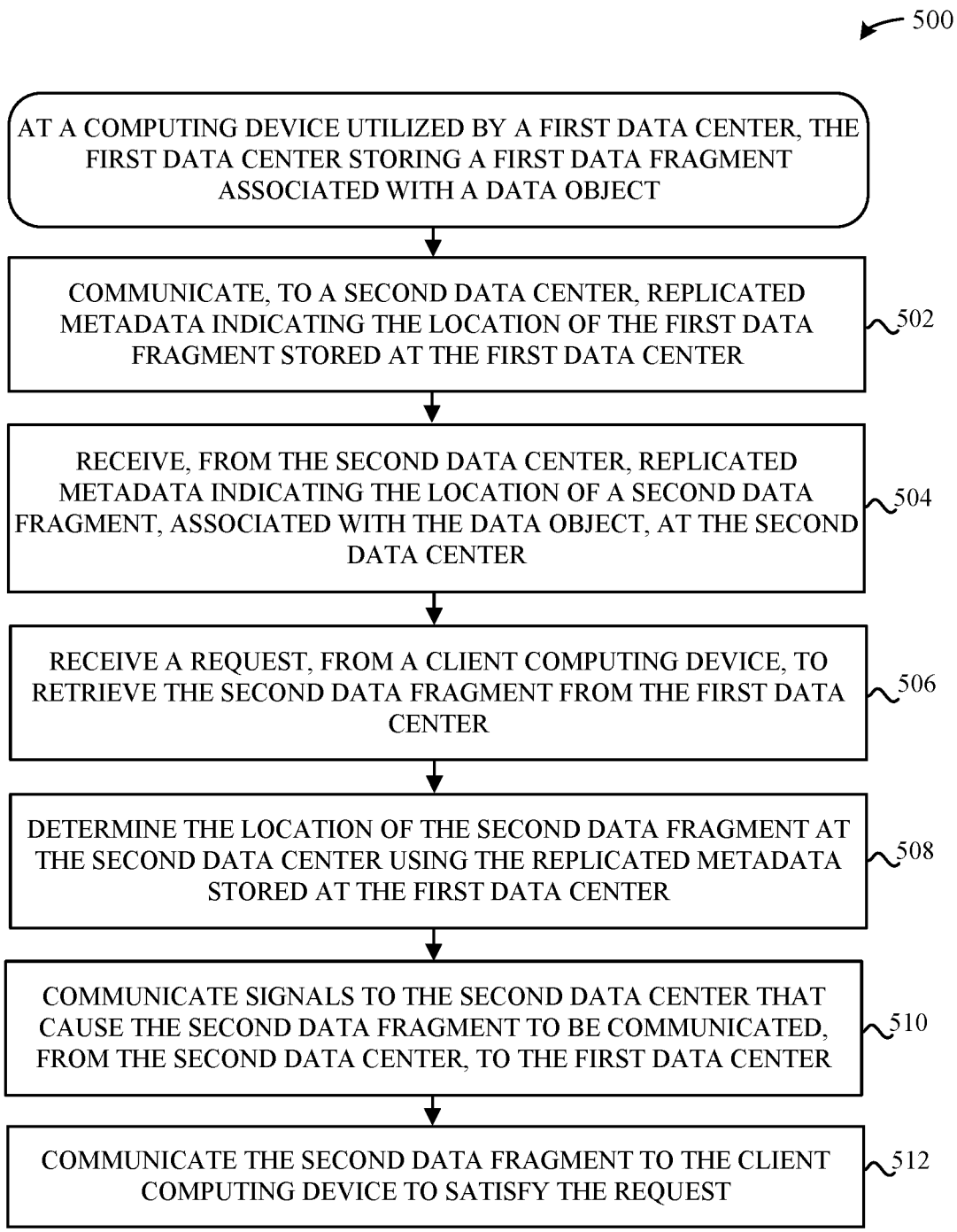
FIG. 5 illustrates an exemplary method for processing a request to retrieve data stored at a data center, according to some embodiments.

FIG. 5 illustrates an exemplary method for processing a request to retrieve data stored at a data center, according to some embodiments. As shown in FIG. 5, the method 500 can be performed at a computing device (e.g., the computing device 102) utilized by a first data center (e.g., the data center 204). According to some embodiments, steps 502-504 can be implemented to establish a scenario in which the first data center stores a first data fragment associated with a data object. In particular, step 502 can involve the first data center communicating, to a second data center, replicated metadata indicating the location of the first data fragment stored at the first data center. Moreover, step 504 can involve the first data center receiving, from the second data center, replicated metadata indicating the location of a second data fragment, associated with the data object, at the second data center. At this juncture, steps 506-512 can be carried out in accordance with the following techniques. In particular, at step 506, a request processing controller receives a request, from a client computing device (i.e., request issued by an application executed on a client computing device), to retrieve the second data fragment from the first data center.

Next, at step 508, the request processing controller determines the location of the second data fragment at the second data center using the replicated metadata stored at the first data center. Next, at step 510, the request processing controller communicates signals to the second data center that cause the second data fragment to be communicated, from the second data center, to the first data center. Finally, at step 512, the request processing controller communicates the second data fragment to the client computing device to satisfy the request.

Figure 6:
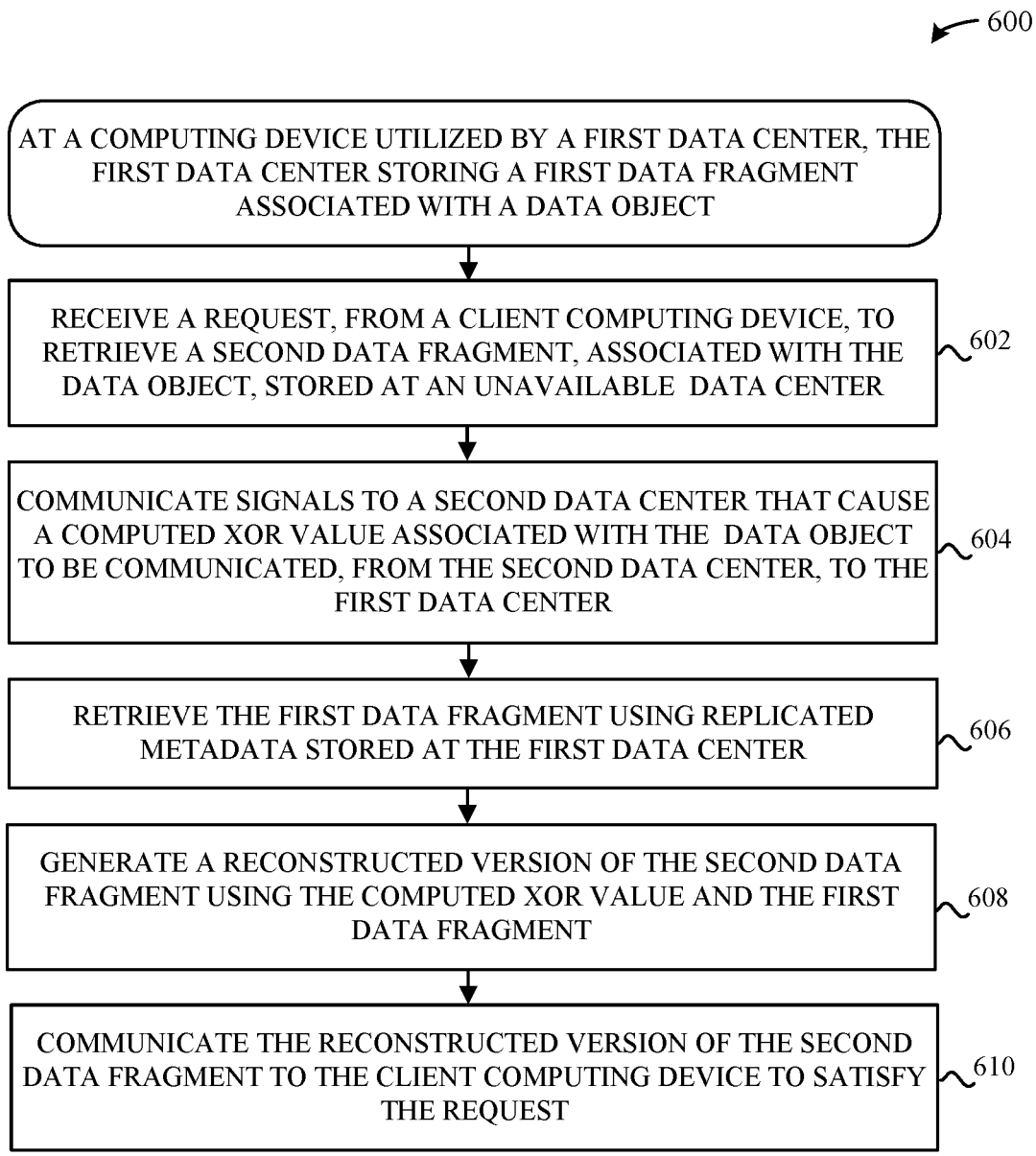
FIG. 6 illustrates an exemplary method for reconstructing data in response to a request to retrieve data stored at an unavailable data center, according to some embodiments.

FIG. 6 illustrates a method for reconstructing data in response to a request to retrieve data stored at an unavailable data center, according to some embodiments. As shown in FIG. 6, the method 600 can be performed at a computing device (e.g., the computing device 102) utilized by a first data center (e.g., the data center 204). Also, as shown in FIG. 6, the first data center stores a first data fragment associated with a data object. Method 600 begins at step 602, where the first data center receives a request, from a client computing device (e.g., the client computing device 302), to retrieve a second data fragment, associated with the data object, stored at an unavailable data center (e.g., the data center 218).

Next, at step 604—and in response to identifying (at step 602) that the data center is unavailable—a request processing controller communicates signals to a second data center (e.g., the data center 318) that cause a computed XOR value associated with the data object to be communicated, from the second data center, to the first data center. Next, at step 606, the request processing controller retrieves the first data fragment using replicated metadata stored at the first data center. Next, at step 608, an XOR computation module generates a reconstructed version of the second data fragment using the computed XOR value and the first data fragment. Finally, at step 610, the request processing controller communicates the reconstructed version of the second data fragment to the client computing device to satisfy the request.

It is noted that this disclosure primarily involves the request processing controller 112 carrying out the various techniques described herein for the purpose of unified language and simplification. However, it is noted that other entities can be configured to carry out these techniques without departing from this disclosure. For example, other software components (e.g., the OS 108, the OS 126, application(s), firmware(s), etc.) executing on the computing devices 102 and 120 can be configured to carry out all or a portion of the techniques described herein without departing from the scope of this disclosure. Moreover, other hardware components included in the computing devices 102 and 120 can be configured to carry out all or a portion of the techniques described herein without departing from the scope of this disclosure. Further, all or a portion of the techniques described herein can be offloaded to another computing device without departing from the scope of this disclosure.

FIG. 7 illustrates a detailed view of a computing device 700 that can be used to implement the various components described herein, according to some embodiments. In particular, the detailed view illustrates various components that can be included in either the computing device 102 or the computing device 120 illustrated in FIG. 1. As shown in FIG. 7, the computing device 700 can include a processor 702 that represents a microprocessor or controller for controlling the overall operation of the computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, and so on. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

As noted above, the computing device 700 also include the storage device 740, which can comprise a single disk or a collection of disks (e.g., hard drives), and includes a storage management module that manages one or more partitions within the storage device 740. In some embodiments, storage device 740 can include flash memory, semiconductor (solid state) memory or the like. The computing device 700 can also include a Random-Access Memory ("RAM") 720 and a Read-Only Memory ("ROM") 722. The ROM 722 can store programs, utilities or processes to be executed in a non-volatile manner. The RAM 720 can provide volatile data storage, and stores instructions related to the operation of applications executing on the computing device 102 or the computing device 120, including the data fragmentation module 110, the request processing controller 112, the data replication module 114, the data compaction module 116, the XOR computation module 128 and/or the XOR request processing controller 130.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for storing data, the method comprising, at a first data storage device:
    receiving the data; and
    in response to determining that a size of the data satisfies a threshold:
        dividing the data to produce a first and second portion of the data, wherein the first and second portions are associated with a computed exclusive or ("XOR") value,
        deleting the second portion stored at the first data storage device,
        receiving a first replicated metadata, wherein the first replicated metadata indicates that the second portion is stored at a second data storage device, and
        communicating, to a remote computing device, one or more of the first portion or the second portion.

2. The method as described in claim 1, wherein the data is divided into the first and second portions based on a scheme that correlates to the size of the data.

3. The method as described in claim 2, wherein the first and second portions are equal or distinct in size.

4. The method as described in claim 1, further comprising:
    replicating metadata stored at the first data storage device to produce a second replicated metadata, wherein the second replicated metadata (1) indicates a location of the first portion stored at the first data storage device, and (2) is communicated to the second data storage device.

5. The method as described in claim 1, wherein receiving the first replicated metadata further comprises:
    updating the first replicated metadata based at least in part on the second portion being deleted from the first data storage device.

6. The method as described in claim 1, wherein communicating either the first portion or the second portion further comprises:
    receiving the second portion from the second data storage device based at least in part on a request, issued from the remote computing device, for the first data storage device to retrieve the second portion.

7. The method as described in claim 1, further comprising:
    encrypting the data prior to dividing the data.

8. A first computing device configured to store data, the first computing device comprising:
    at least one processor; and
    at least one memory configured to store instructions that, when executed by the at least one processor, cause the first computing device to:
        divide the data to produce a first and second portion of the data, wherein the first and second portions are associated with a computed exclusive or ("XOR") value;
        delete the second portion stored at the first computing device, based at least in part on whether the computed XOR value is established;
        receive a first replicated metadata, wherein the first replicated metadata indicates a location of the second portion stored at a second computing device; and
        communicate either the first portion or the second portion, to a remote computing device, based at least in part on the first replicated metadata.

9. The first computing device as described in claim 8, wherein the at least one processor further causes the first computing device to:
    determine a size of the data prior to dividing the data; and
    divide the data based at least in part on the size not satisfying threshold criteria for dividing the data.

10. The first computing device as described in claim 9, wherein the at least one processor further causes the first computing device to store the data at the first computing device based at least in part on the size satisfying the threshold criteria.

11. The first computing device as described in claim 8, wherein the at least one processor further causes the first computing device to:
    replicate metadata stored at the first computing device to produce a second replicated metadata, wherein the second replicated metadata (1) indicates a location of the first portion stored at the first computing device, and (2) is communicated to the second computing device.

12. The first computing device as described in claim 8, wherein the at least one processor further causes the first computing device to:

update the first replicated metadata based at least in part on the second portion being deleted from the first computing device.

13. The first computing device as described in claim 8, wherein the at least one processor further causes the first computing device to:
receive the second portion from the second computing device based at least in part on a request, issued from the remote computing device, for the first computing device to retrieve the second portion.

14. The first computing device as described in claim 8, wherein the data is encrypted prior to being divided by the first computing device.

15. A method of providing data to a remote computing device, the method comprising, at a first data storage device:
computing a first XOR value for the data, wherein (1) the data comprises a first portion and a second portion of the data, and (2) the first portion is stored at the first data storage device and the second portion is stored at a second data storage device;
associating the first and second portions to the first XOR value;
reconstructing the second portion, based at least in part on the second data storage device being unavailable, by comparing the first XOR value and the first portion to produce a reconstructed second portion; and
communicating the reconstructed second portion to the remote computing device.

16. The method as described in claim 15, wherein computing the first XOR value further comprises:
translating the first and second portions into a first binary representation value and a second binary representation value, respectively; and
computing the first XOR value by comparing individual bits of the first and second binary representation values.

17. The method as described in claim 15, wherein reconstructing the second portion further comprises:
translating the first XOR value and the first portion into a first binary representation value and a second binary representation value, respectively;
computing a second XOR value by comparing individual bits of the first binary representation value and the second binary representation value; and
generating the reconstructed second portion based at least in part on the second XOR value, wherein the second XOR value and the second portion share a same binary representation value.

18. The method as described in claim 15, wherein reconstructing the second portion further comprises:
reconstructing the second portion based at least in part on the remote computing device requesting that the first data storage device provide the second portion to the remote computing device.

19. The method as described in claim 15, further comprising:
storing the first XOR value for the first and second portions of the data at a third data storage device.

20. The method as described in claim 15, wherein the first, second, and third data storage devices each located within separate data centers.

* * * * *